(12) United States Patent
Terakawa et al.

(10) Patent No.: US 6,950,588 B2
(45) Date of Patent: Sep. 27, 2005

(54) OPTICAL WAVE GUIDE, AN OPTICAL COMPONENT AND AN OPTICAL SWITCH

(75) Inventors: Yukari Terakawa, Kyoto (JP); Hayami Hosokawa, Kyoto (JP)

(73) Assignee: Omron Corporation, Kyoto (JP)

( * ) Notice: Subject to any disclaimer, the term of this patent is extended or adjusted under 35 U.S.C. 154(b) by 11 days.

(21) Appl. No.: 10/368,131

(22) Filed: Feb. 18, 2003

(65) Prior Publication Data

US 2003/0156813 A1 Aug. 21, 2003

(30) Foreign Application Priority Data

Feb. 19, 2002 (JP) ............................ 2002/042409

(51) Int. Cl.⁷ .............................. G02B 6/02; G02B 6/10
(52) U.S. Cl. ........................................ 385/129; 385/123
(58) Field of Search ............................ 385/123, 129, 385/14

(56) References Cited

U.S. PATENT DOCUMENTS

| | | | |
|---|---|---|---|
| 5,138,687 A | 8/1992 | Horie et al. | |
| 5,511,142 A | 4/1996 | Horie et al. | |
| 5,757,995 A | 5/1998 | Chen et al. | |
| 6,466,707 B1 * | 10/2002 | Dawes et al. | 385/14 |
| 6,542,684 B2 * | 4/2003 | Eldada et al. | 385/129 |

FOREIGN PATENT DOCUMENTS

| | | |
|---|---|---|
| EP | 0 420 173 A2 | 4/1991 |
| EP | 0 777 138 A2 | 6/1997 |
| JP | 60-17705 | 1/1985 |
| JP | 63-65406 | 3/1988 |
| JP | 3-168704 | 7/1991 |
| JP | 4-157403 | 5/1992 |
| JP | 5-114767 | 5/1993 |
| JP | 5-142435 | 6/1993 |
| JP | 5-257018 | 10/1993 |
| JP | 7-270632 | 10/1995 |
| JP | 7-306325 | 11/1995 |
| JP | 7-318739 | 12/1995 |
| JP | 9-15435 | 1/1997 |
| JP | 9-325228 | 12/1997 |
| JP | 10-206911 | 8/1998 |
| JP | 11-305055 | 11/1999 |
| JP | 2000-180648 | 6/2000 |
| JP | 2001-141950 | 5/2001 |
| JP | 2001-281482 | 10/2001 |

OTHER PUBLICATIONS

US 5,854,878, 12/1998, Fujitsu Limited (withdrawn)
European Search Report for European Patent Application No. 03100269.4–2216.
Patent Abstracts of Japan Publication No. 60–017705, dated Jan. 29, 1985, 1 page.

(Continued)

*Primary Examiner*—John R. Lee
*Assistant Examiner*—Paul M. Gurzo
(74) *Attorney, Agent, or Firm*—Osha Liang LLP

(57) ABSTRACT

An optical wave guide has a lower cladding layer formed on a substrate, and a Y-branched optical wave guide arranged on the lower cladding layer. The optical wave guide is covered with an upper cladding layer. Curved portions of the optical wave guide are tapered at the external circumferential sides and formed into a trapezoidal cross sectional shape, and effective refractive index of the optical wave guide is made small at the tapered external circumferential sides. Meanwhile, end surfaces of the optical wave guide are formed into a rectangular shape, thereby joint efficiency with optical fibers is increased.

10 Claims, 35 Drawing Sheets

OTHER PUBLICATIONS

Patent Abstracts of Japan Publication No. 63–065406, dated Mar. 24, 1988, 1 page.
Patent Abstracts of Japan Publication No. 04–157403, dated May 29, 1992, 1 page.
Patent Abstracts of Japan Publication No. 05–114767, dated May 7, 1993, 1 page.
Patent Abstracts of Japan Publication No. 05–142435, dated Jun. 11, 1993, 1 page.
Patent Abstracts of Japan Publication No. 05–257018, dated Oct. 8, 1993, 1 page.
Patent Abstracts of Japan Publication No. 07–306325, dated Nov. 21, 1995, 1 page.
Patent Abstracts of Japan Publication No. 07–318739, dated Dec. 8, 1995, 1 page.
Patent Abstracts of Japan Publication No. 09–015435, dated Jan. 17, 1997, 1 page.
Patent Abstracts of Japan Publication No. 11–305055, dated Nov. 5, 1999, 1 page.
Patent Abstracts of Japan Publication No. 2000–180648, dated Jun. 30, 2000, 1 page.
Patent Abstracts of Japan Publication No. 2001–141950, dated May 25, 2001, 1 page.
Patent Abstracts of Japan Publication No. 2001–281482, dated Oct. 10, 2001, 1 page.
Patent Abstracts of Japan Publication No. 07–270632, dated Oct. 20, 1995, 1 page.
Patent Abstracts of Japan Publication No. 09–325228, dated Dec. 16, 1997, 1 page.
Patent Abstracts of Japan Publication No. 10–206911, dated Aug. 7, 1998, 1 page.

* cited by examiner

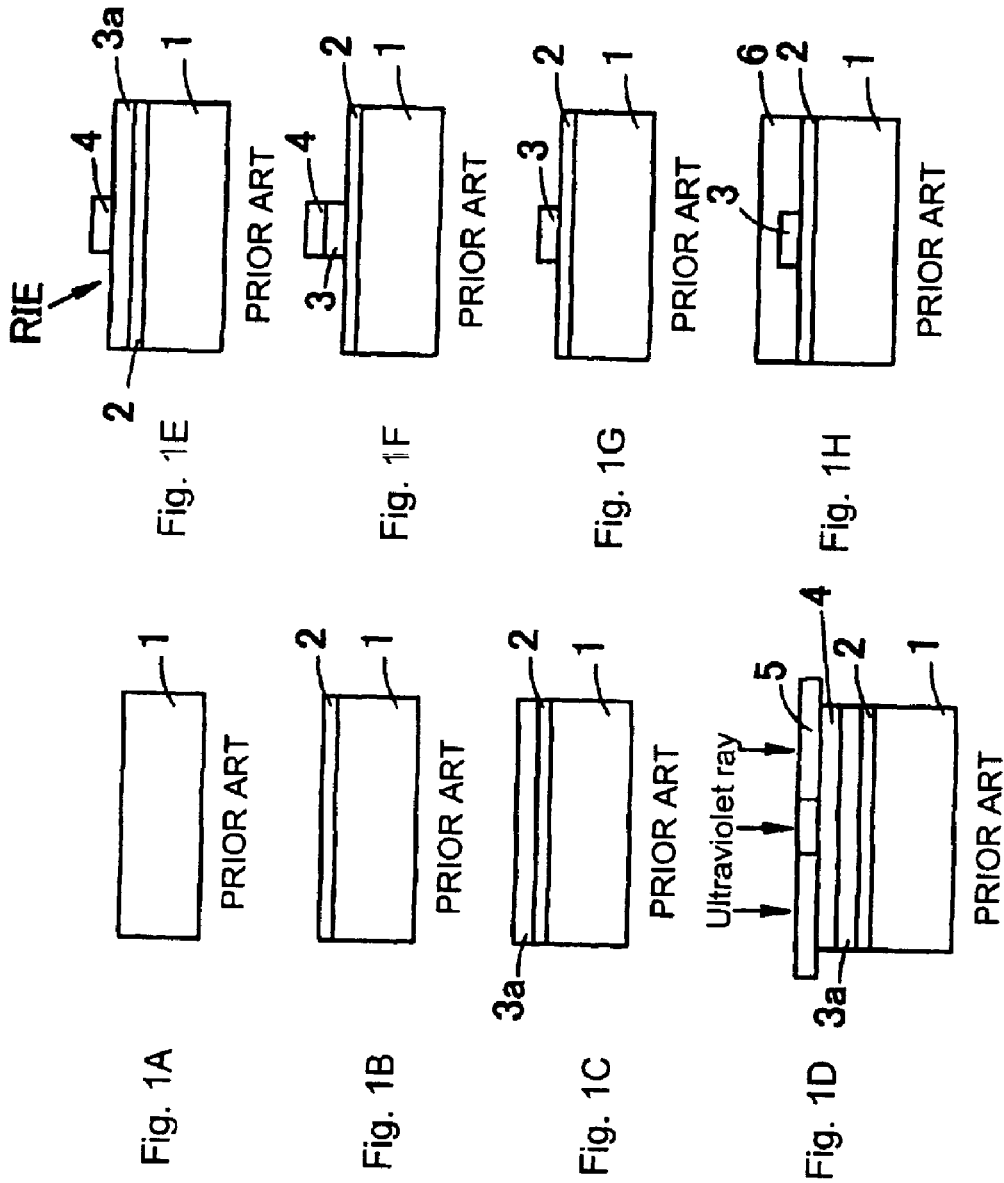

PRIOR ART

PRIOR ART

PRIOR ART

Fig. 23A
Fig. 23B
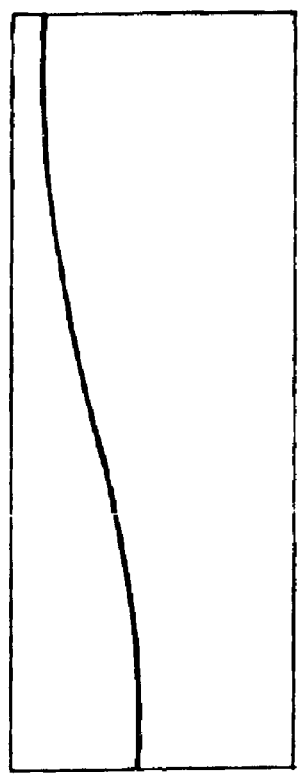
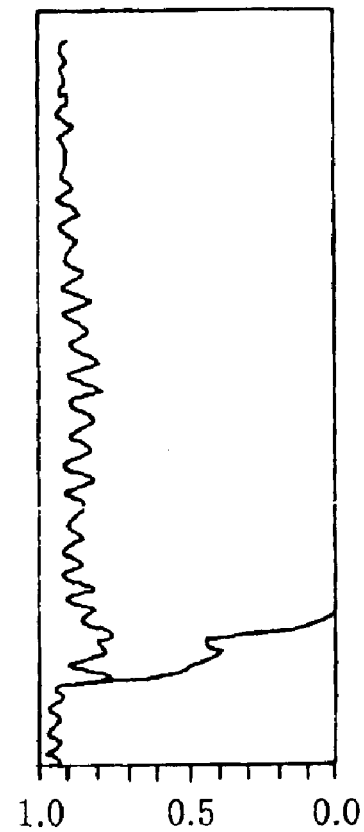
1.0    0.5    0.0

1.0   0.5   0.0

PRIOR ART

PRIOR ART

OPTICAL WAVE GUIDE, AN OPTICAL COMPONENT AND AN OPTICAL SWITCH

BACKGROUND OF THE INVENTION

1. Field of the Invention

The present invention relates to an optical wave guide, an optical component and an optical switch.

2. Description of the Background Art

In recent years, communications by use of optical fibers that enable the transmitting a large amount of data at high speed have become the mainstream in the art. Accordingly, optical wave guides for guiding optical signal to be used at connections and the like with optical fibers, light sources, light detecting elements require a more compact size and high precision with less transmitting loss.

Such optical wave guides are made into a structure wherein a portion whose refractive index is slightly higher is made on the surface of a substrate as a core, and they are manufactured through a semiconductor process, for example, as shown in FIG. 1.

The manufacturing process of an optical wave guide by semiconductor process is explained with reference to FIG. 1 below. First, a cladding material is accumulated and hardened on a substrate 1, and thereby, a lower cladding layer 2 is formed (FIG. 1A, FIG. 1B). Thereafter, a core material is accumulated and hardened on the lower cladding layer 2, and thereby, a core layer 3a is formed (FIG. 1C). Then, resist 4 is applied onto the surface of the core layer 3a, an exposure mask 5 is placed onto the resist 4, and exposure is made by ultraviolet ray radiation (FIG. 1D). After exposure, the resist 4 is developed, and thereby, patterning is made. Only a portion for forming a core is covered with the resist 4 (FIG. 1E). Then, with the residual resist 4 as an etching mask, the exposed area of the core layer 3a is removed by reactive ion etching (RIE), a core 3 is formed under the resist 4 (FIG. 1F), and the resist 4 is removed and the core 3 is exposed (FIG. 1G). Thereafter, cladding material is accumulated and hardened on the core 3 and the lower cladding layer 2, and an upper cladding layer 6 is formed. Thereby, an optical wave guide is obtained wherein a channel type core 3 is embedded between the lower cladding layer 2 and the upper cladding layer 6 (FIG. 1H).

According to the semiconductor process, the core 3 is formed into a rectangular or square cross sectional shape as shown in FIG. 2A along the full length of the core 3. Alternatively, as shown in FIG. 2B, by tapering both the sides by etching, the core is made into a trapezoidal shape (a mesa structure) wherein the bottom side (the side contacting the lower cladding layer 2) is longer than the top side.

In such an optical wave guide as described above, light coming from the incoming end of the core 3 into the core 3 is totally reflected by interfaces among the lower cladding layer 2 and the upper cladding layer 6 and the core 3 (for example, the upper and lower surfaces and left and right side surfaces of the core 3 in the case of a rectangular core, is transmitted through the inside of the core 3, and is ejected via a light outgoing end to the outside. Main causes of transmitting loss in light transmitted through the core 3 include loss arising at curved portions of the core 3 and loss arising at end surfaces of the core 3.

First, the loss at the curved portions of the core 3 is explained below. As shown in FIGS. 3 and 4, with respect to the loss arising at the curved portion in the curved core 3, when light comes from the straight portion of the core 3 into the external circumferential surface of the curved portion, the incident angle θ2 of light coming into the external circumferential surface of the core 3 becomes smaller than the critical angle of full reflection. Thus, light is not fully reflected to the inside of the core 3, and light is radiated from the core 3 to the upper cladding layer 6. Consequently, loss occurs.

FIG. 5 and FIG. 6 explain transmitting loss at the curved portion of the core 3 in viewpoint of wave optics. FIG. 5 shows the effective refractive index along the line A–A' in the straight portion of the core 3 in FIG. 3 (the effective refractive index of a straight optical wave guide) and the effective refractive index along the line B–B' in the curved portion (the effective refractive index of a curved optical wave guide).

In the straight optical wave guide, the distribution of the effective refractive index in the direction crossing the core 3 appears to be a symmetrical one to the center of the core 3, as shown by the dotted line in FIG. 5, while in the curved optical wave guide, as shown by the solid line in FIG. 5. The effective refractive index becomes high at the external circumferential side, and the effective refractive index becomes low at the internal circumferential side. For this reason, light being transmitted through the core 3 is confined in the core 3 at the portion of the straight optical wave guide. However, while it passes the portion of the curved optical wave guide, the light is radiated and expanded into the upper cladding layer 6 at the external circumferential side where the refractive index gets high. As a result, loss occurs. Also, at the portion of the curved optical wave guide, where the electric field distribution of wave guide mode is distorted, irregularity of the electric field distribution occurs at the inlet of the curved optical wave guide portion and light is radiated to the outside of the core 3. As a result, loss occurs.

In order to restrict the transmitting loss at the curved portion of the core 3, it may be effective to make the radius of curvature R of the curved portion large so that the incident angle to the external circumferential surface of the core 3 should become larger than the critical angle. However, making the radius of curvature R large requires lengthening of the curved portion of the core 3 so as to obtain a necessary curve angle. As a result, an optical wave guide becomes long and large. Therefore, in prior art optical wave guides, the reduction of transmitting loss in the curved portion and the compact size of an optical wave guide have been a tradeoff.

Next, the joint loss arising at the end surfaces of the core 3 is described below. The loss arising at the end surfaces of the core 3 arises at optical connections at the light incident end or the light outgoing end of the core 3, other optical element and the like. In order to reduce such joint loss, in a single mode core 3, it is preferred that the shapes of the light incident end and the light outgoing end are close to the end surface shape of an optical fiber or the like to be connected to the core 3.

Next, an optical switch according to the prior art as an application of an optical wave guide is explained below. FIGS. 8A, 8B, and 8C are the cross sectional views showing cross sections at C1–C1', C2–C2', and C3–C3' in FIG. 7 respectively. In an optical switch, a Y-branched core 3 is formed on a substrate 1, and two units of a heater 7 are arranged so as to pinch the top of the branch portion of the core 3 at the upper surface of an upper cladding layer 6 covering the core 3. The core 3 appears to be a rectangular at any cross section in FIGS. 8A, 8B, and 8C, or appears a narrow trapezoid at the heater sides.

In the above structure, when one of the heaters 7 is turned on and thereby heat is generated, the temperature goes up at the heated heater 7 side. As a result, the refractive indexes of the core 3 and the upper cladding layer 6 at the heat generating side become small by thermal optical (TO) effect, and light transmitted through the non-branched portion of the core 3 is transmitted to the branch portion at non-heat generating side, and the light is hardly transmitted to the heat generating side. Thus, by switching over the heater 7 to be heated, it is possible to switch the route of the light transmission (branch direction).

In such an optical switch, functionality to completely switch light routes just as in an electric switch is required, and there is a demand for an optical switch having a high extinction ratio. In such an optical switch, so as to obtain a high extinction ratio, it is necessary to make the branch angle of the core 3 small, or to make the refractive index difference given by heaters large.

However, when the branch angle is made small, if the interval between the branch portions of the core 3 at light outgoing end is tried to be made sufficiently large so as to connect an optical fiber thereto, the core length becomes long until the branch portions of the core 3 get apart sufficiently. Consequently, the size of an optical switch will become long and large, which has been a problem in the prior art.

Further, when the refractive index difference given by heaters is made large, the amount of heat generated by the heaters is required to be increased. As a consequence, electric consumption of an optical switch will become higher, which has been another problem in the prior art. Moreover, when the refractive index change is large, wherein an abrupt change of refractive index occurs in wave guide direction, multi-mode occurs in a single mode core. As a result, excessive loss will occur. This leads to an undesired reduction of extinction ratio, which has been still another problem in the prior art.

SUMMARY OF THE INVENTION

The present invention has been made in consideration of the above problems with the prior art. Accordingly, it is an object to provide an optical wave guide that enables the reducing core loss and the increase of the free degree of core shape. Moreover, it is another object of the present invention to provide an optical component using the optical wave guide, and an optical switch of a compact size able to attain high extinction ratio.

An optical wave guide according to the present invention is one equipped with a core for confining and transmitting light. The core is characterized by the thickness at the center portion of the cross section thereof and the thickness at both the sides of the cross section thereof having respectively different areas, and the cross sectional shape of the core varies along the lengthwise direction of the core.

In an optical wave guide according to the present invention, wherein the cross sectional shape of the core varies along the lengthwise direction of the core, and there are variable portions, even by use of a uniform core material, it is possible to vary the effective refractive index of the core by varying cross sectional shapes. Therefore, it is possible to control the effective refractive index of the core at an optional portion of the core by varying the cross sectional shapes, and to control the electric field distribution that is transmitted through the core. For example, at the curved portion and branch portion of the core, light electric field distribution may be controlled to prevent light from leaking from the core and causing loss. Accordingly, it is also possible to curve the core with a large curvature while restricting transmitting loss. As a consequence, it is possible to increase the free degree of core shapes, and further, to curve the core direction largely without making an optical wave guide large.

Although it is difficult to manufacture such a core by semiconductor process, easy manufacturing may be made by the method of forming a core by filling a slot on a cladding substrate that is made through injection molding with a core material, or by the method of forming a core by stamping by use of stamper.

In a preferred embodiment of an optical wave guide according to the present invention, the side outline in a cross section of the core varies along the lengthwise direction of the core. For example, the cross section of the core is of an arc at the sides, and the curvature or the radius of curvature of the sides is varying. In such a preferred embodiment, because the side outline of the core varies, it is possible to vary the thickness at core sides, and to control light radiated from core sides.

In an optical wave guide, wherein the cross sectional shape of the core is trapezoidal at least in a partial area, and the side inclination of the core varies along the lengthwise direction of the core, it is possible to easily vary core cross sectional shapes. Particularly, it is possible to manufacture a core according to the present invention by a molding method.

In another preferred embodiment of an optical wave guide according to the present invention, the end surface shape of the core is made into a shape appropriate for reducing joint loss with an element to be connected with the end surface of the core. In the case of a single mode core, the end surface shape of such a core is rectangular. With such an end surface shape, it is possible to increase the joint efficiency in combining core end surfaces to elements such as an optical fiber and the like.

An optical component according to the present invention is one wherein a heating module for heating the core is added to an optical wave guide according to the present invention. According to such an optical component, it is possible to vary the refractive index of the core by heating the core using the heating module, and to control behaviors of light transmitting through the core. Further, with an optical wave guide according to the present invention, it is possible to reduce light loss, and by varying the core cross sectional shapes, it is possible to control light behaviors at heating by the heating module. Accordingly, it is possible to control behaviors of light transmitting through the core by control of the heating module, and to obtain a compact size optical component with little loss.

An optical switch according to the present invention is one equipped with a core having a branch portion and a heating module for heating the branch portion of the core. The core is characterized in that the thickness at the center portion of the cross section thereof and the thickness at both the sides of the cross section thereof have respectively different areas, and the cross sectional shape of the core varies along the lengthwise direction of the core.

In an optical switch according to the present invention, it is possible to switch over the light transmission directions at branch portions by controlling the heated portion of core by the heating module. Further, the cross sectional shape of the core varies along the lengthwise direction of the core, and there are variable portions, even using a uniform core material. Thus, it is possible to vary the effective refractive index of the core by varying cross sectional shapes. Therefore, it is possible to control the effective refractive index of the core at an optional portion of the core by varying the cross sectional shapes, and to control the electric field distribution that is transmitted through the core. For example, at the curved portion and branch portion of the core, light electric field distribution may be controlled to prevent light from leaking from the core and causing loss. Accordingly, it is also possible to curve the core with a large curvature while restricting transmitting loss. As a consequence, it is possible to increase the free degree of core shapes, and further, to curve the core direction largely without making an optical switch large. As a consequence, according to the present invention, it is possible to manufacture an optical switch of low loss and yet high extinction ratio.

Although it is difficult to manufacture such a core by semiconductor process, easy manufacturing may be made by the method of forming a core by filling a slot on a cladding substrate that is made through injection molding with a core material, or by the method of forming a core by stamping by use of stamper.

A preferred embodiment of an optical switch according to the present invention is characterized in that in the cross section of the branch portion of the core, when the cross section of the core is divided into two equal parts in the direction perpendicular to the surface wherein the heating module is arranged, among the cross sections divided into two equal parts, the area of the cross section closer to the heating module is larger than that of the cross section farther from the heating module. And another preferred embodiment of an optical switch according to the present invention is characterized in that in the cross section of the branch portion of the core, among the sides in the direction parallel to the surface wherein the heating module is arranged, the length of the side closer to the heating module is longer than that of the side farther from the heating module. As cross sectional shapes of such a core, for example, there is a trapezoidal shape whose width is wider at the side of the heating module. In these preferred embodiments, core is arranged displaced to the heating module side. Therefore, the changes of refractive index becomes sensitive to heating by the heating module, as a result, it is possible to increase extinction ratio.

Still another preferred embodiment of an optical switch according to the present invention is characterized in that the end surface shape of the core is made into a shape appropriate for reducing joint loss with an element to be connected with the end surface of the core. In the case of a single mode core, the end surface shape of such a core is rectangular. With such an end surface shape, it is possible to increase the joint efficiency in combining core end surfaces to elements such as an optical fiber and the like.

The composition elements of the present invention explained above may be combined arbitrarily as many as possible.

BRIEF DESCRIPTION OF THE DRAWINGS

FIG. 1A through FIG. 1H show diagrams for explaining the manufacturing process of an optical wave guide in the prior art.

FIG. 2A shows a cross sectional view of a cross sectional shape of the core in the optical wave guide, while

FIG. 23A shows a top view wherein light transmitting power at the moment when only one heater is turned on in the optical switch according to the present invention is shown by line thickness, while FIG. 23B shows a graph with the horizontal axis showing power intensity, and with the vertical axis showing power changes in respective branch cores in the lengthwise distance of optical switch.

FIG. 24A shows a top view wherein light transmitting power at the moment when only one heater is turned on in the conventional optical switch is shown by line thickness, while

DESCRIPTION OF THE PREFERRED EMBODIMENTS

First Embodiment

Figure 9:
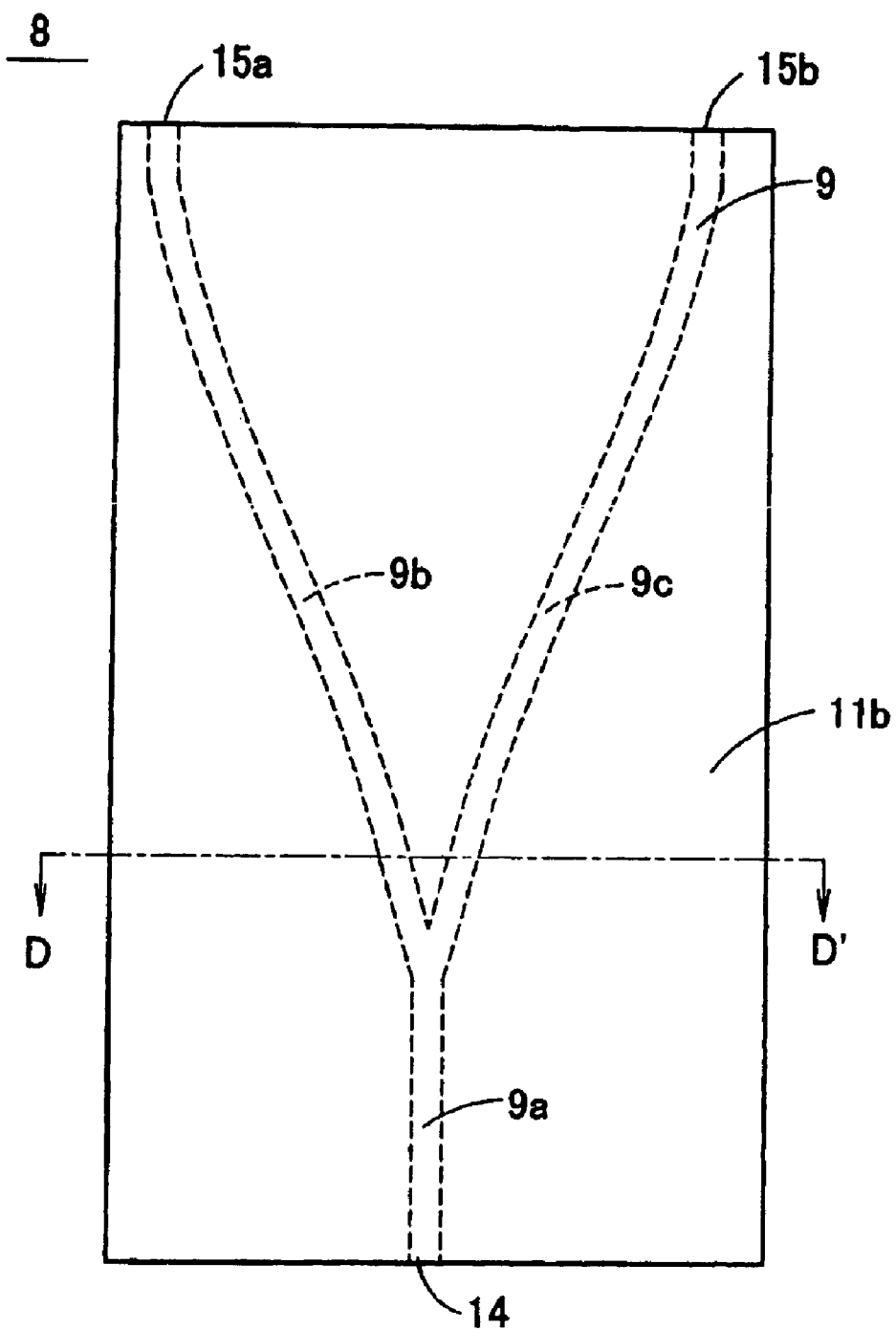
FIG. 9 shows a top view of an optical wave guide according to a preferred embodiment of the present invention.
Figure 10A:
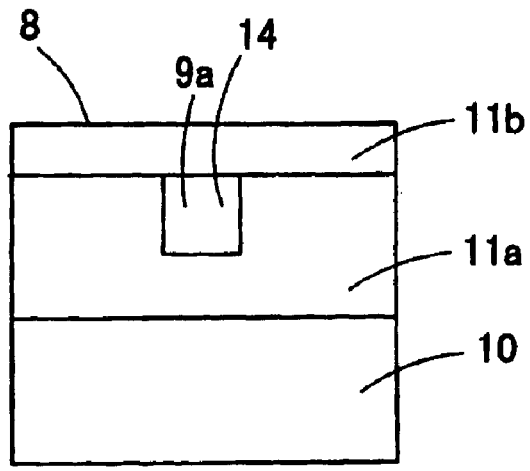
FIG. 10A shows a front view of the optical wave guide in FIG. 9 viewed from the light incident end side thereof.
Figure 10B:
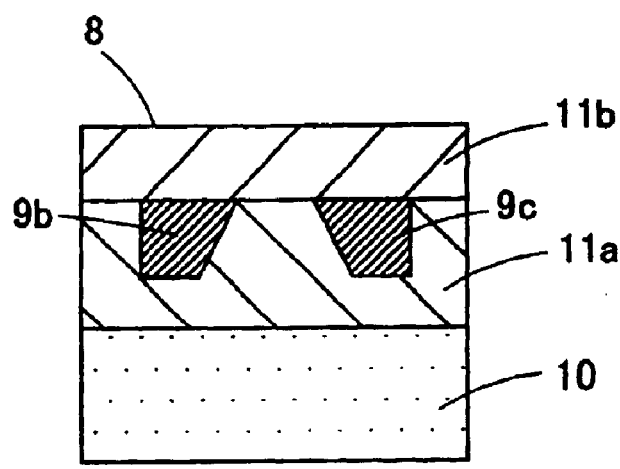
FIG. 10B shows a cross sectional view at the line D–D' in FIG. 9.
Figure 10C:
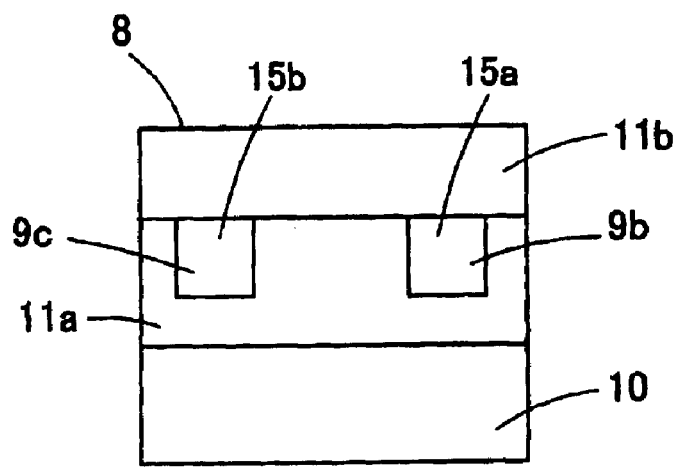
FIG. 10C shows a rear view the optical wave guide in FIG. 9 viewed from the light outgoing end side thereof.

FIG. 9 shows a top view of an optical wave guide 8 in accordance with a preferred embodiment of the present invention. FIGS. 10A, through 10C respectively show a front view (the surface having a light incident end 14 of a core 9) of the optical wave guide 8 shown in FIG. 9, a cross sectional view at the line D–D', and a rear view thereof (the surface having light outgoing ends 15a and 15b of the core 9). The optical wave guide 8 according to the present invention comprises a substrate 10, a lower cladding layer 11a, a Y-branched core 9, and an upper cladding layer 11b. The core 9 is branched into a Y-shape. One end surface of a non-branch core 9a becomes a light incident end 14, and the end of the non-branch core 9a is branched into branch cores 9b and 9c. The end surfaces of the branch cores 9b and 9c are light outgoing ends 15a and 15b. This optical wave guide 8 functions as a light branching device that branches light incoming from the light incident end 14 of the core 9, and ejects branched light through the light outgoing ends 15a and 15b. To the light incident end 14, a light projecting module such as a light emitting device or an optical fiber or the like is connected, while to the light outgoing ends 15a and 15b, light receiving devices such as a light receiving device or an optical fiber or the like is connected. As shown in FIG. 10B, the cross sections of the core 9 near the branch portion (branch cores 9b and 9c) are trapezoidal, while as shown in FIGS. 10A and 10C, the cross sectional shapes around and at the end surfaces 14, 15a, and 15b of the core 9 are rectangular.

Figure 6:
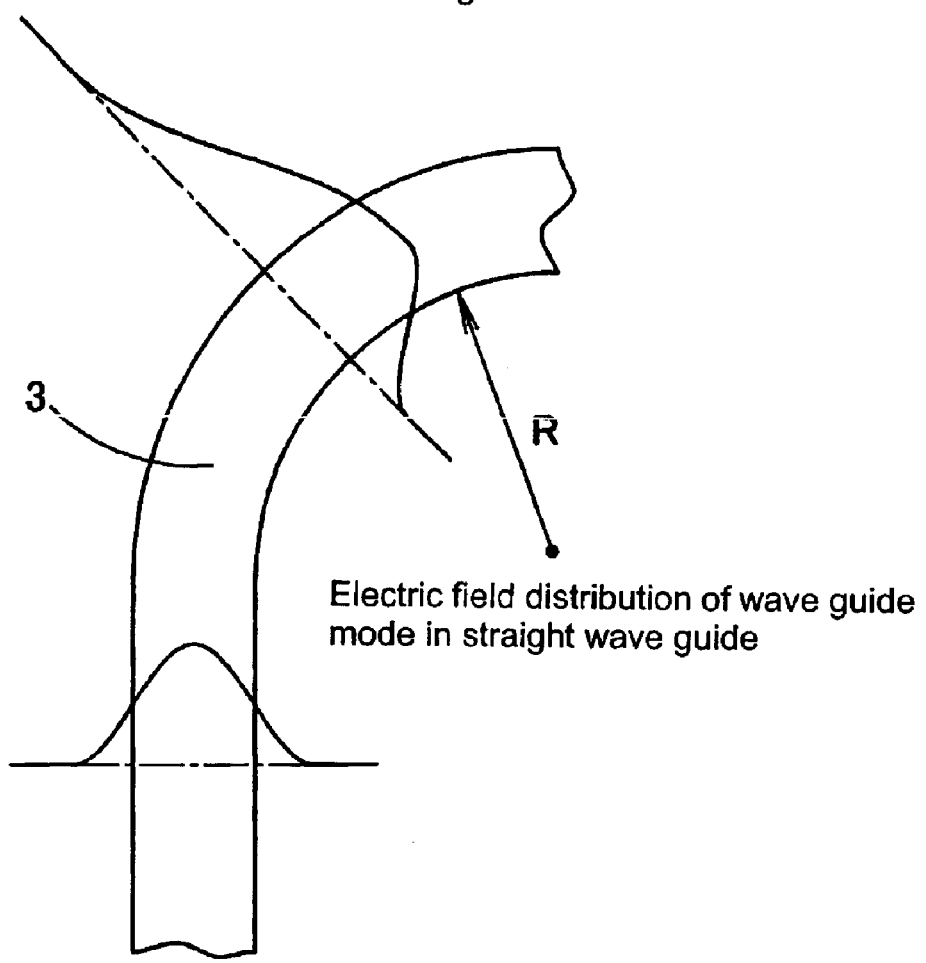
FIG. 6 shows a diagram for explaining the electric field distribution of wave guide mode in the curved core.
Figure 7:
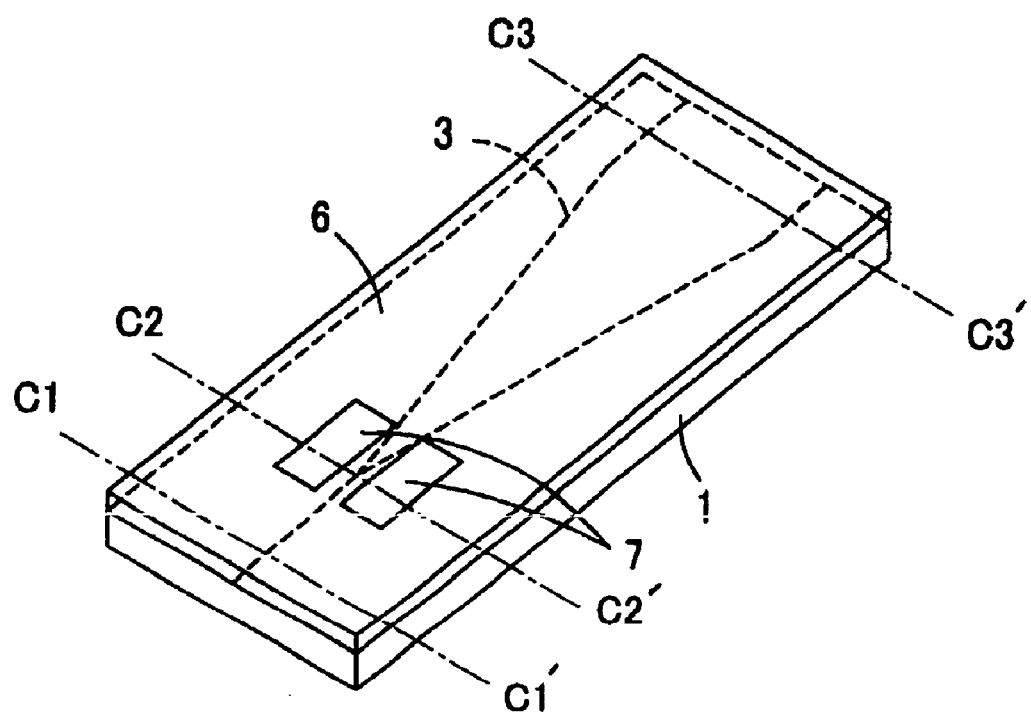
FIG. 7 shows a perspective view of a structure of an optical switch in the prior art.
Figure 8:
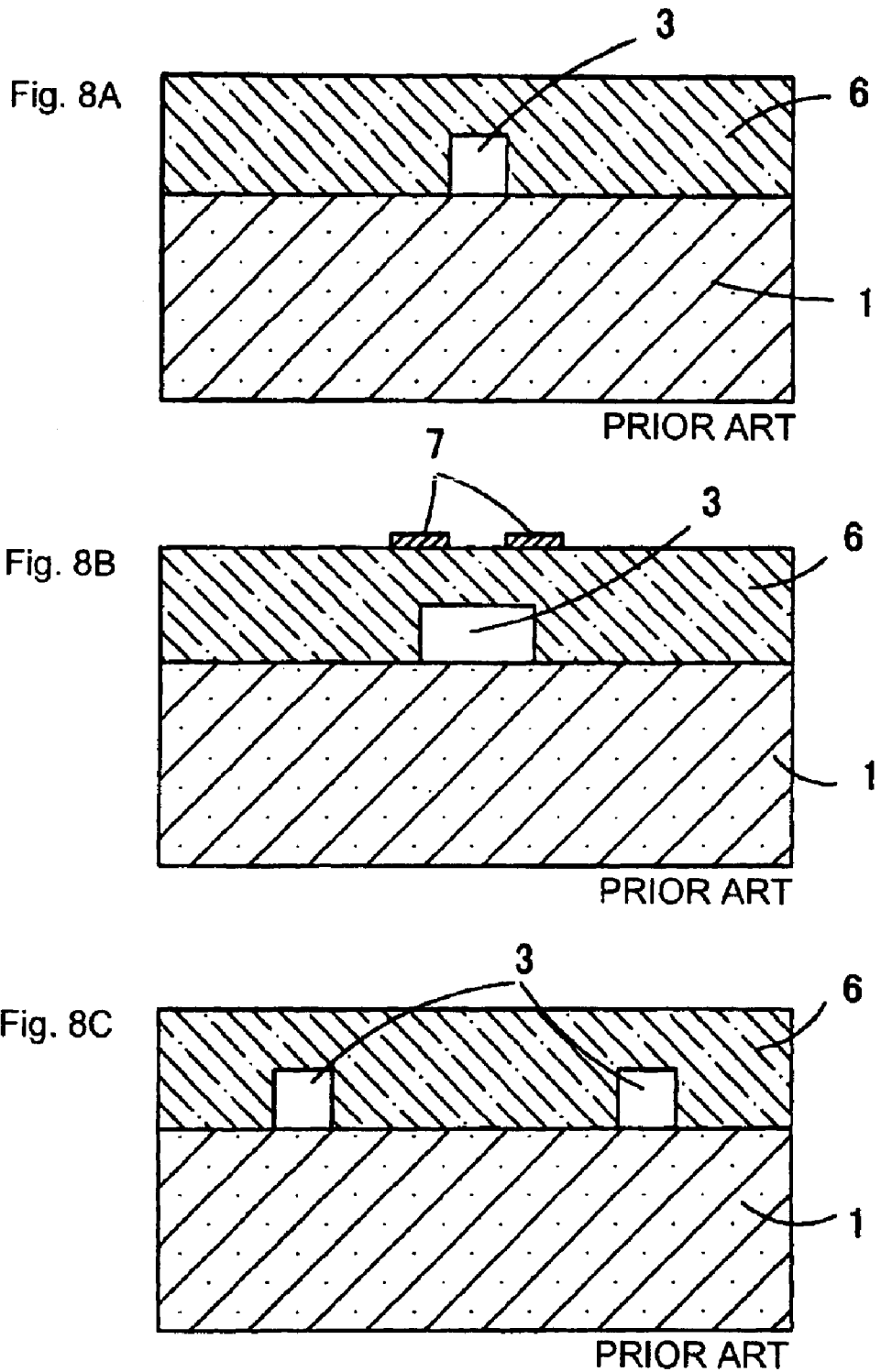
FIG. 8A shows a cross sectional view at the line C–C' in FIG. 7.
FIG. 8B shows a cross sectional view at the line C2–C2'.
FIG. 8C shows a cross sectional view at the line C3–C3' in FIG. 7.
Figure 11:
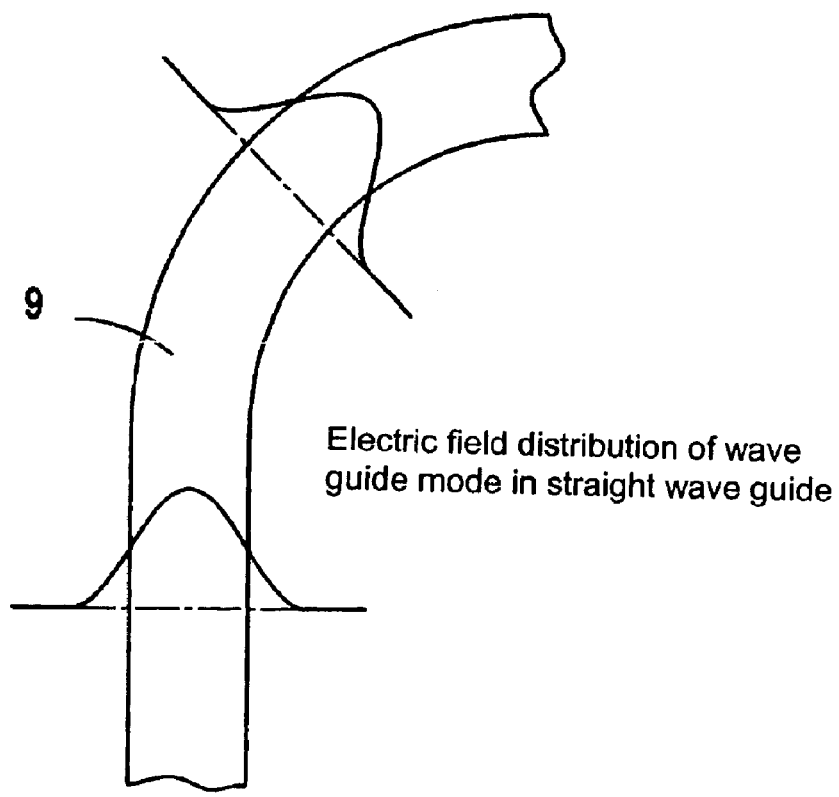
FIG. 11 shows a diagram for explaining the electric field distribution of wave guide mode in the core of the optical wave guide shown in FIG. 9.

In this optical wave guide 8, in the curved portion near the branch portion, the cross sections of the branch core 9b and 9c are curved into an inversely tapered shape. In the case wherein the cross section of core is rectangular, at such a curved portion, the electric field distribution of the light transmission mode shifts to the external circumferential side as shown in FIG. 6; while in this optical wave guide 8 where the cross sections of the core 9 are inclined into the inversely tapered shape at the curved portion, as shown in FIG. 11, the electric field distribution of transmission mode shifts to the internal circumferential side, and light is confined in the core 9 and hardly leaks out. As a consequence, the transmitting loss of light going through the core 9 becomes small even when the radius of curvature R of the curved portion is made small.

Figure 12:
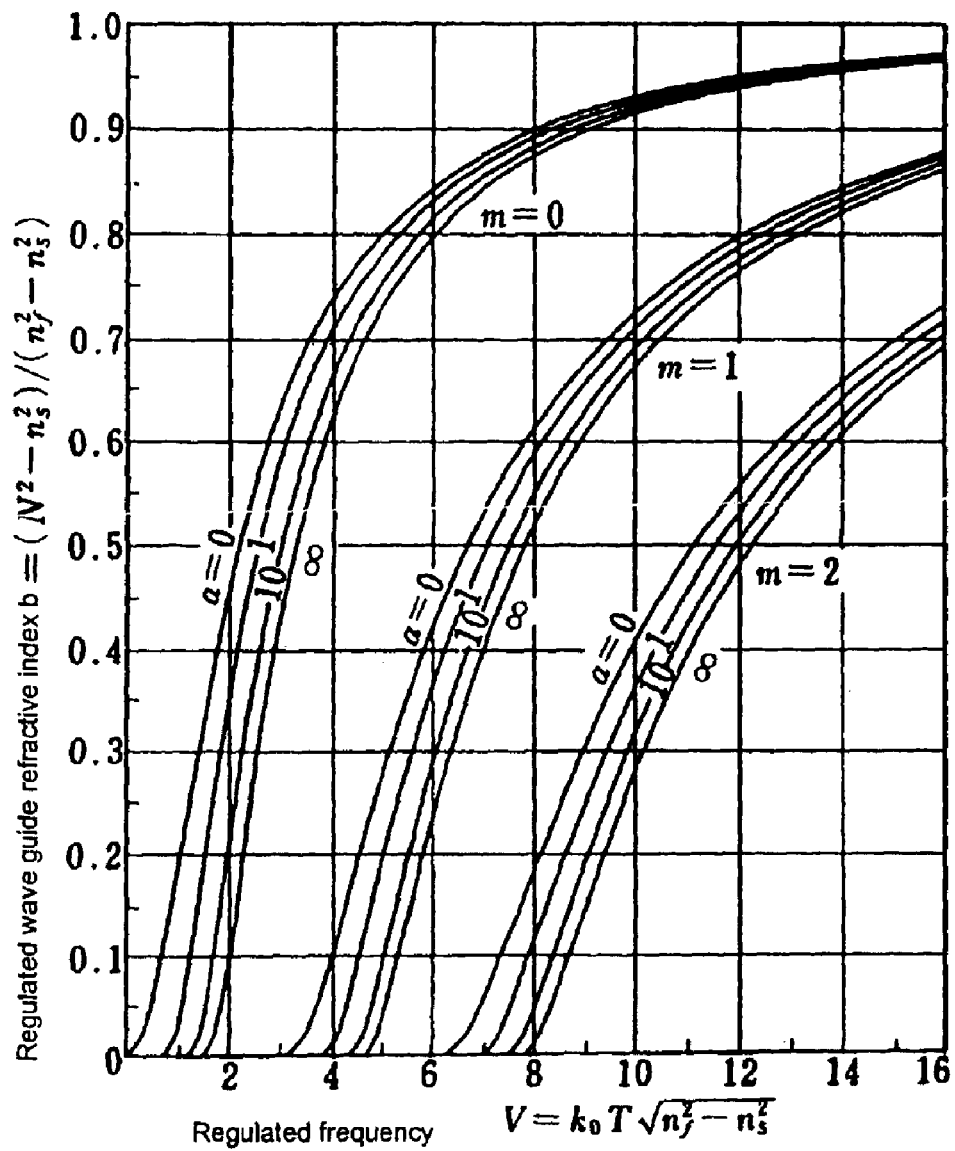
FIG. 12 shows a dispersion curve of a step type two-dimensional core.

The reason why light is unlikely to leak out and loss becomes small when the side surface of the external circumferential side of the core 9 is inclined in an inversely tapered shape is considered as below. FIG. 12 shows a dispersion curve expressing the relation between regulated frequency V and regulated core refractive index b of a step type two-dimensional core (page 16 of "Optical Integrated Circuit" written by Hiroshi Nishihara, Masamitsu Haruna, and Toshiaki Yasuhara, published by Ohm on Feb. 25, 1985). Herein, the regulated frequency V and the regulated core refractive index b are respectively given by the following equations (1) and (2), and m is a mode number of light to be transmitted, and a is what is called scale of asymmetry. When the refractive index of the core 9 is set as $n_f$, the refractive index of the lower cladding layer 11a is set as $n_s$, and the refractive index of the upper cladding layer 11b is set as $n_c$, a is expressed by the followings equation.

$$a=(n_s^2-n_c^2)/(n_f^2-n_s^2) \quad \text{Equation 1}$$

$$V=k_oT\sqrt{n_f^2-n_s^2} \quad (1)$$

$$b = \frac{N^2 - n_s^2}{n_f^2 - n_s^2} \quad (2)$$

Wherein, k0 is a wave number in vacuum, and when light wave number in vacuum is set as λ, its stands that k0=2π/λ. While, T is the thickness of core, $n_f$ is the refractive index of the core 9, and $n_s$ is the refractive index of the lower cladding layer 11a. N is the effective refractive index of transmission mode, and when the incident angle to core interface is incident angle θ, N is defined by the equation $N=n_f \sin θ$.

Figure 2A:
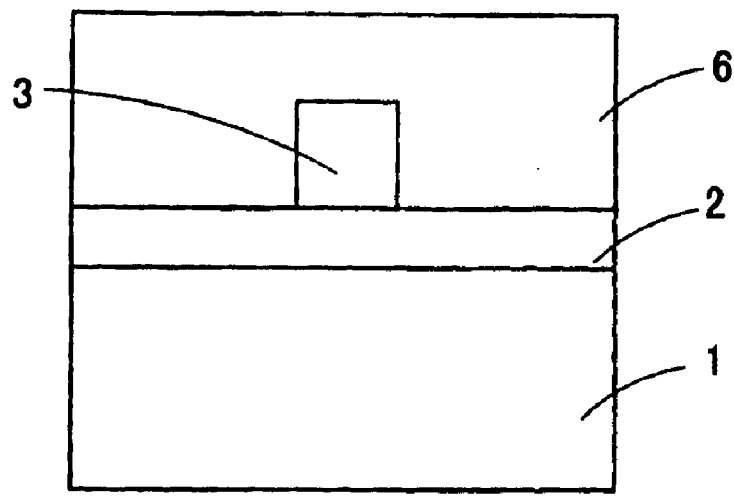
Figure 2B:
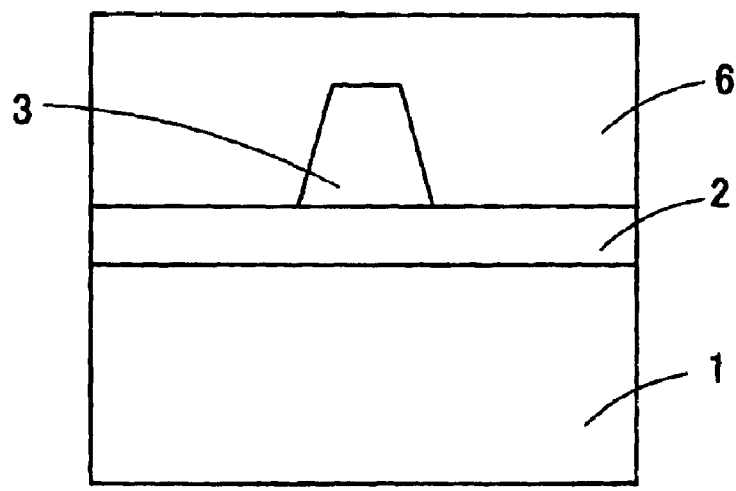
FIG. 2B shows a cross sectional view of another cross sectional shape of the core in the same optical wave guide
Figure 3:
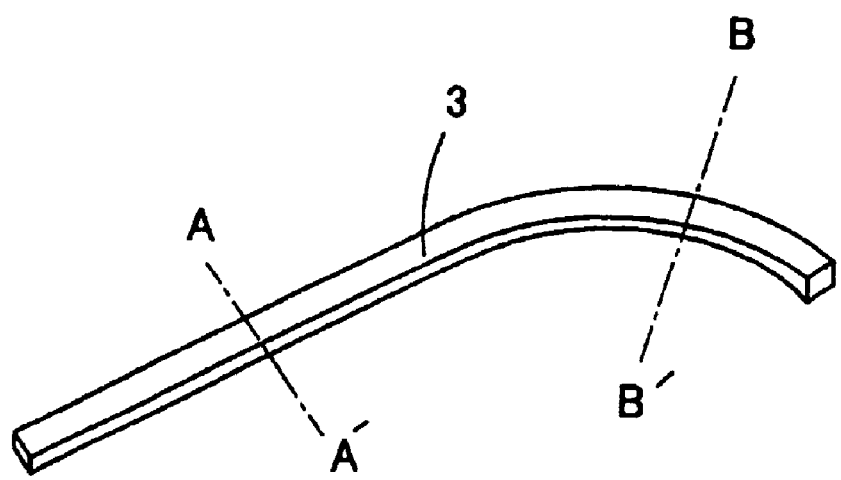
FIG. 3 shows a perspective view of a curved core.
Figure 4:
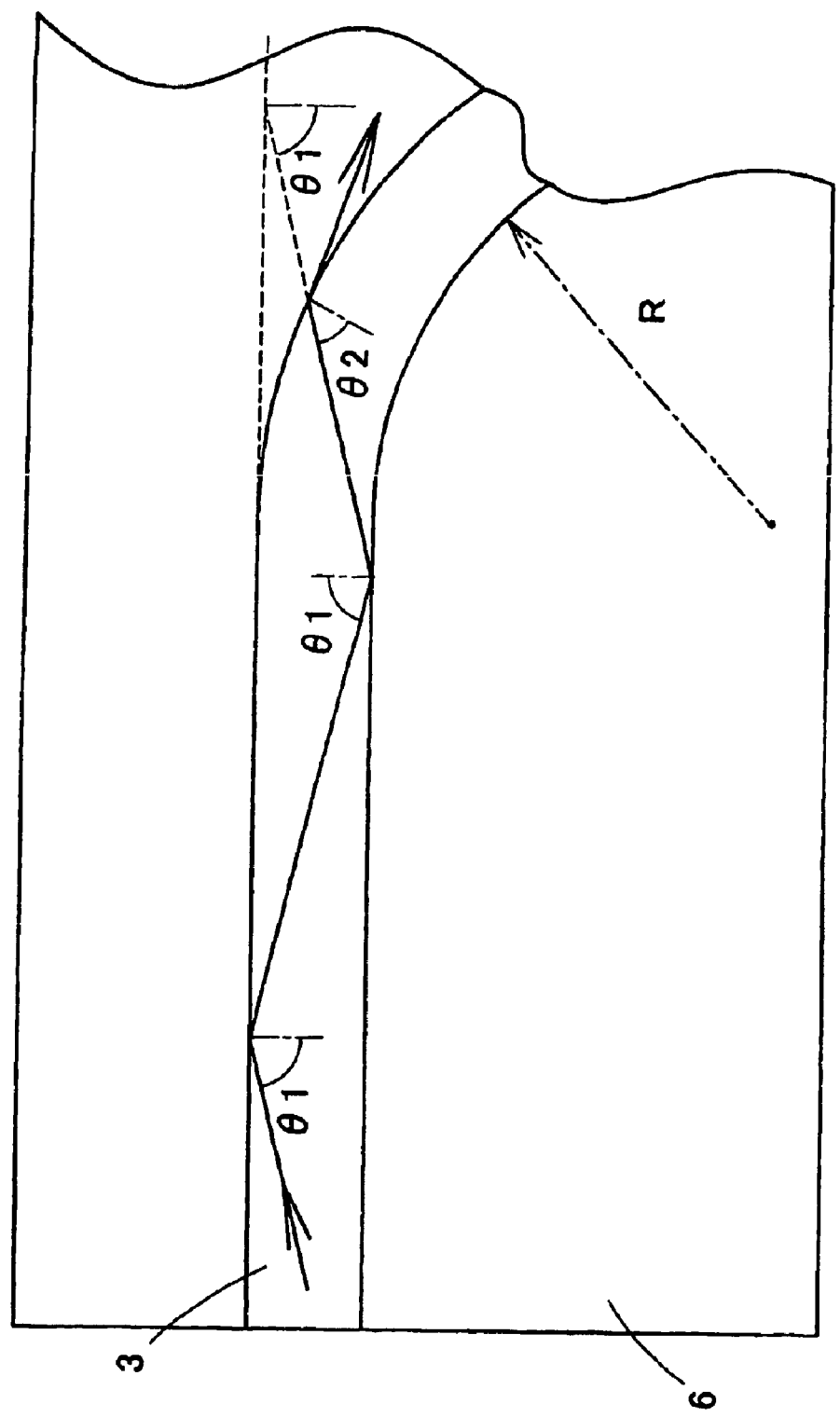
FIG. 4 shows a diagram for explaining the reason why light is radiated and loss occurs at the curved core.
Figure 5:
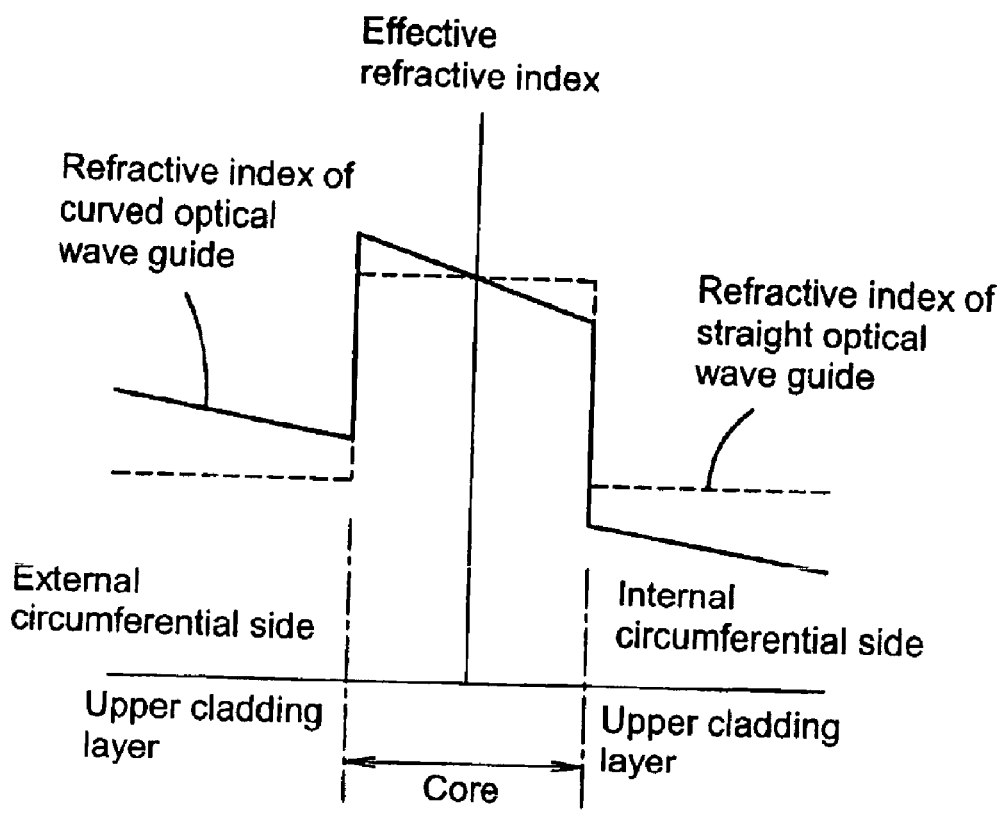
FIG. 5 shows changes in refractive index along the direction crossing the curved core.

In the optical wave guide 8, the thickness of the core 9 is thin at the edge (the portion of a wedge shape) of the external circumferential side of the core 9 because of the inclination of the side surface of the external circumferential side. As shown in FIG. 12, when the thickness K of the core 9 becomes thin, the regulated frequency V gets small. Therefore, at the edge of the external circumferential side of the core 9, the regulated core refractive index b becomes small. Alternatively, when viewed from a position perpendicular to the optical wave guide 8, the core 9 whose refractive index is larger than that of the upper cladding layer 11b is thin at the external circumferential portion, it may be said that the average refractive index is small at the external circumferential portion of the core 9. As a result, inclination of refractive index at a curved core as shown in FIG. 5 is eased, and the electric field distribution of transmission mode of light transmitting through the core 9 is induced into the internal circumferential side whose refractive index is high as shown in FIG. 11. As a consequence, light radiation to the external circumferential side becomes small, thereby it is possible to reduce light loss at the curved portion of the core 9.

As described above, in the core 9 of a shape that enables to control transmitting loss arising in the branch cores 9b and 9c, even if the angle between the branch portions is made large, it is possible to transmit light at higher precision than by a Y-branched core according to the prior art. As the angle between the branch cores 9b and 9c become larger, the distance between the light outgoing end 15a of the core 9 and the light outgoing end 15b becomes farther. As a consequence, even if the total length of the core 9 is made short, it is possible to secure space for arranging optical elements to be connected to the light outgoing ends 15a and 15b. Therefore, in the optical wave guide 8, it is possible to attain a compact size core.

Also, in the optical wave guide 8, because the end surface shape of the core 9 is made into a shape appropriate for reducing joint loss with an element to be connected with the end surface of the core such as an optical element or the like, it is possible to reduce loss also at connection portions, and to transmit light in efficient manners.

Accordingly, in the optical wave guide 8, it is possible to vary the cross sectional shapes of the core 9 according to the positions thereof or flat surface shapes and the like. Also, it is possible to increase the free degree of shapes of the core 9, while making the curvature of the curved portion large and keeping loss of the core 9 small. Particularly, when making the curvature of the curved portion large, it is possible to prevent the optical wave guide 8 from becoming long and large. Thus, an optical wave guide 8 with a compact size can be made.

Further, it is possible to vary the cross sectional shape (inclining angle of side surface) of the core 9 sharply, while it is preferable to vary it gradually, and thereby, prevent light from reflecting diffusely or leaking out.

FIG. 13 shows diagrams for explaining the manufacturing process of the optical wave guide 8. In the manufacturing process of the optical wave guide 8, first, not yet hardened ultraviolet ray hardening resin is applied onto a substrate 10, and pressed by a stamper 12 having an inverted pattern of the core 9 on the surface thereof. Ultraviolet ray is radiated thereunto, and the ultraviolet ray hardening resin is hardened. Thereby, a lower cladding layer 11a is formed (FIGS. 13A and 13B).

Figure 13A:
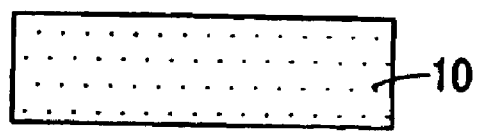
FIG. 13A through FIG. 13E show cross sectional views for explaining the manufacturing process of the optical wave guide shown in FIG. 9.
Figure 13B:
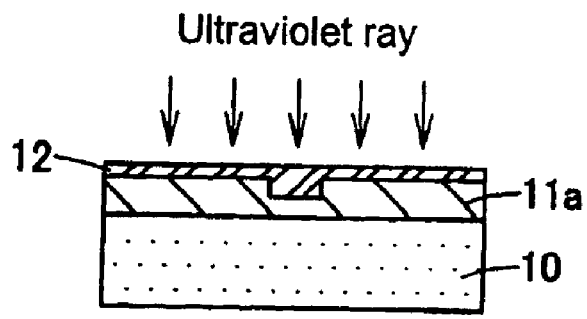
Figure 13C:
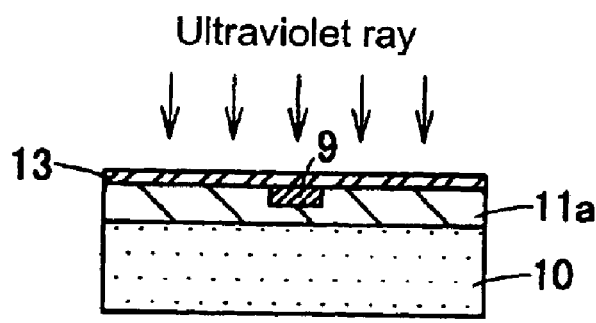
Figure 13D:
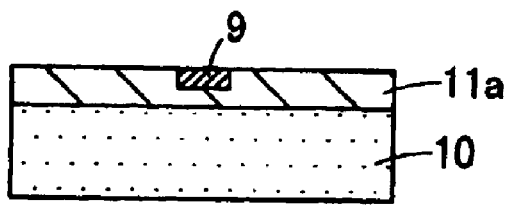

Into the concave in the lower cladding layer 11a formed in the manners above, ultraviolet ray hardening resin (core resin) whose refractive index is larger than that of the lower cladding layer 11a is filled. Ultraviolet ray is radiated thereunto, and the ultraviolet ray hardening resin is hardened (FIG. 13C). Thereafter, a flat plate 13 is peeled off, and the core 9 on the lower cladding layer 11a is expanded thin using a spin coater (FIG. 13D).

Figure 13E:
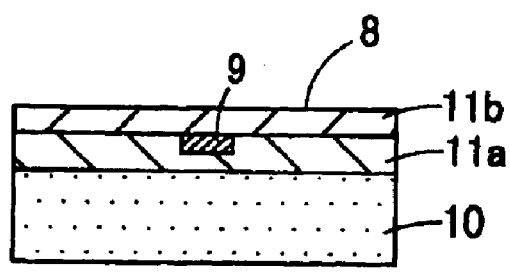

Thereafter, resin to become an upper cladding layer 11b whose refractive index is smaller than that of the core 9 is applied thereunto and exposed. Thereby, the optical wave guide 8 is completed (FIG. 13E). The thickness of the formed core 9 is around 6~10 μm, while the thickness of the upper cladding layer 11b is about 10 μm. It is not always necessary to form the upper cladding layer 11b.

The stamper 12 or the original disk of the stamper to be employed in the manufacturing process of the optical wave guide 8 may be made into a desired shape by laser processing a glass plate, a resin plate or the like. Therefore, by use of this stamper 12, it is possible to form a core 9 in which the cross sectional shape thereof varies at positions. And by the manufacturing method shown in FIG. 12, it is also possible to manufacture a core 9 that has an inverted trapezoidal cross section wherein the length of the bottom side is shorter than that of the top side. Such a cross section cannot have been formed in a semiconductor process. Also, the core 9 may be formed by injection molding.

Figure 14:
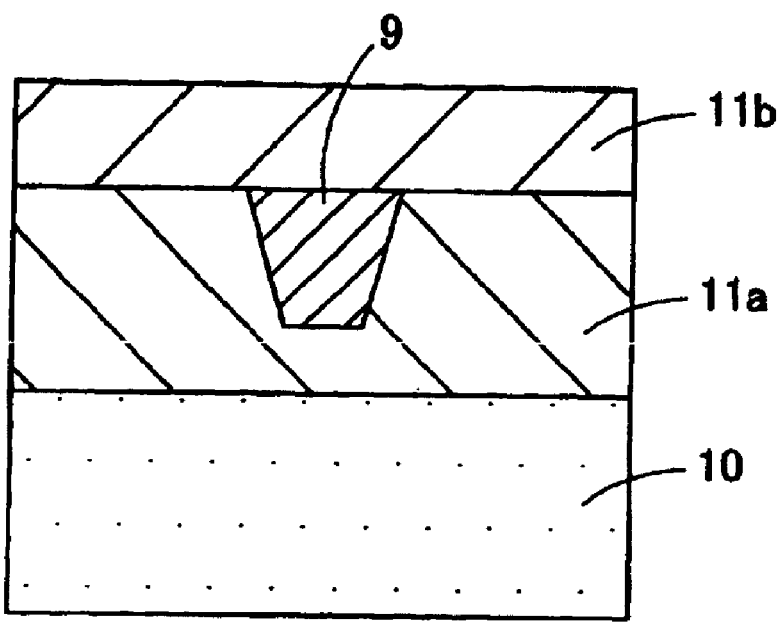
FIG. 14 shows a cross sectional view for explaining the cross sectional shape of a non-branch core in the optical wave guide.
Figure 15:
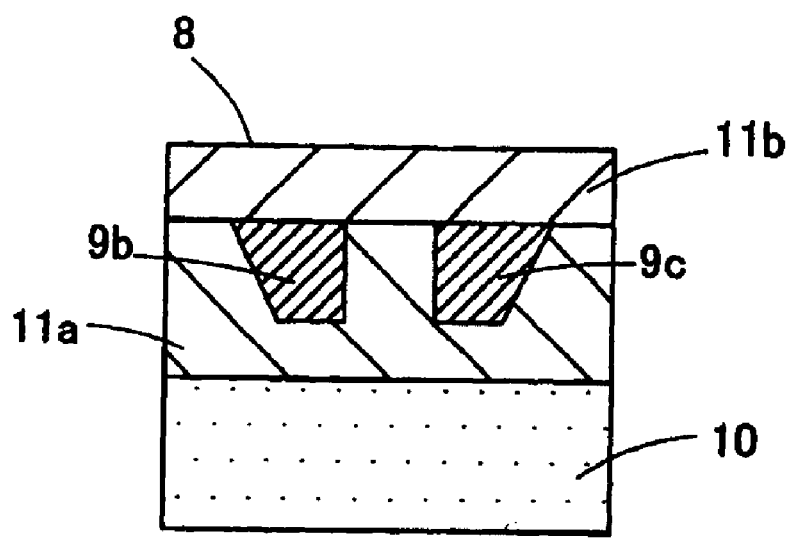
FIG. 15 shows a cross sectional view for explaining the cross sectional shape of a branch core at another position in the optical wave guide.

In FIG. 10B, the cross sectional shapes of the branch cores 9b and 9c at the area near the branch portion are made into a trapezoidal shape. Meanwhile, the cross sectional shapes at positions apart from the branch portion of the non-branch core 9a, and the branch cores 9b and 9c, may be made into a trapezoidal shape as shown in, for example, FIG. 14. Also, as the branch cores 9b and 9c are curved into an S-shape, the cross sectional shapes at the portions curved oppositely to the position of the cross section D–D' in FIG. 9 (for example, around the center between the cross section D–D' and the rear surface) may be made into a trapezoidal shape by inclining the side surface of the external circumferential side.

Figure 16A:
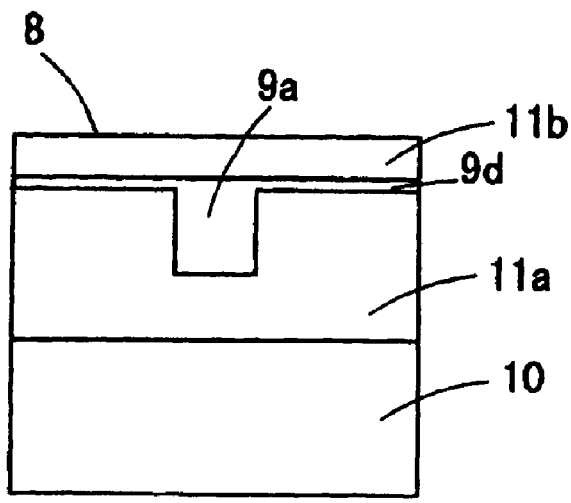
FIG. 16A, FIG. 16B and FIG. 16C show respectively a front view, across sectional view, and a rear view for explaining a modified example of the optical wave guide according to the preferred embodiment shown in FIG. 9.
Figure 16B:
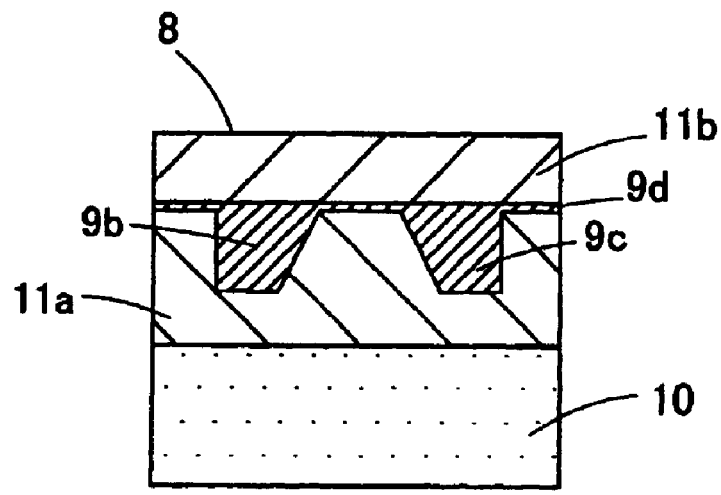
Figure 16C:
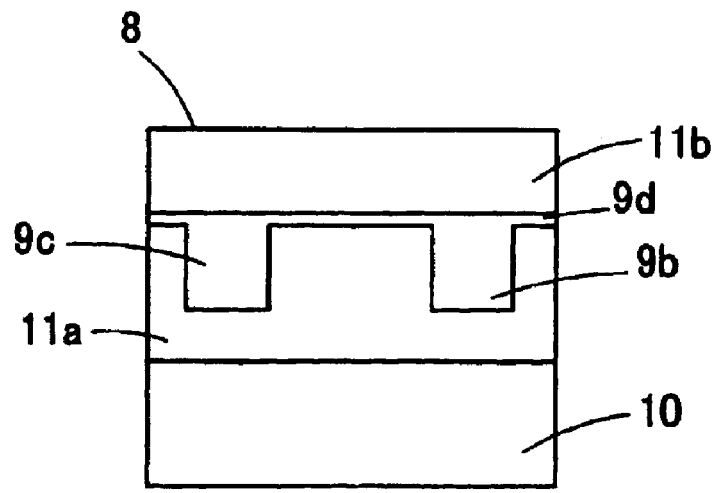

FIGS. 16A through 16C show, respectively, a front view of a modified example of the optical wave guide 8 according to the preferred embodiment concerned, a cross sectional view corresponding to the line D–D' in FIG. 9, and a rear view thereof. It is shown that when the core 9 is formed, the core resin flows out from the side of the core 9 onto the upper surface of the lower cladding layer 11a, and a thin film or bar 9d is formed. In the optical wave guide 8, it is no problem that bar 9d as shown in FIG. 16A through 16C may be formed, however, if light going through the core 9 comes into the bar 9d, light will leak out through the bar 9d. Therefore, it is preferred to make the thickness of the bar 9d as thin as possible.

Second Embodiment

Figure 17:
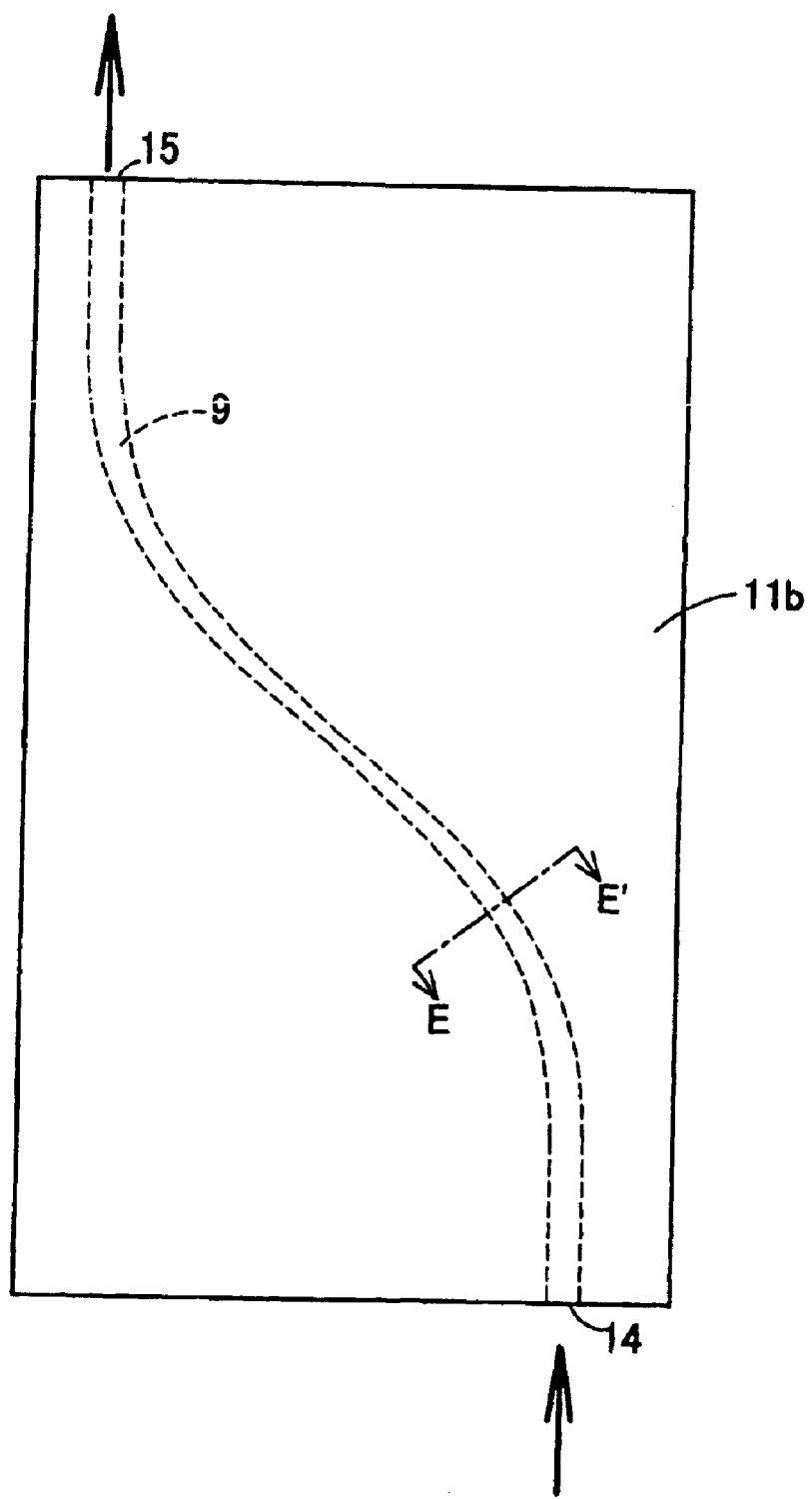
FIG. 17 shows a top view of an optical wave guide (an S-shaped wave guide) according to another preferred embodiment of the present invention.
Figure 18A:
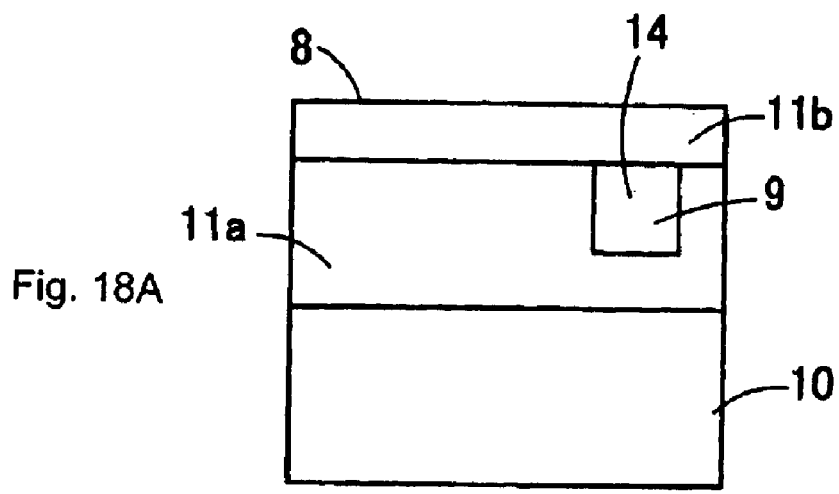
FIG. 18A shows a front view of the optical wave guide.
Figure 18B:
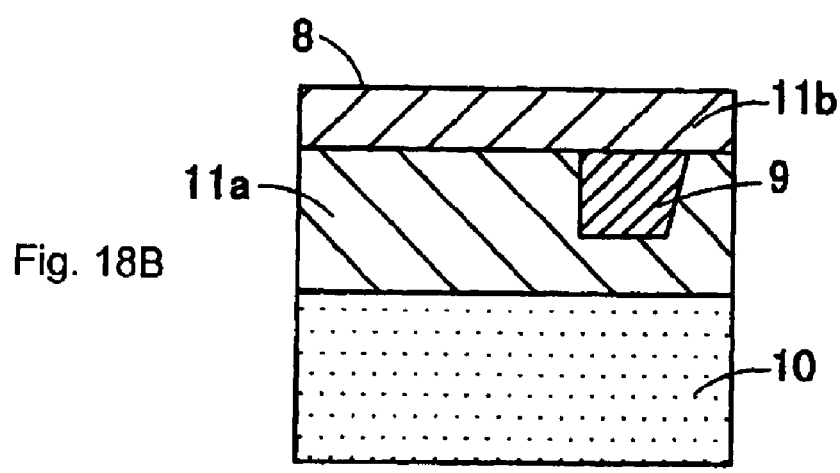
FIG. 18B shows a cross sectional view at the line E–E' in FIG. 17.
Figure 18C:
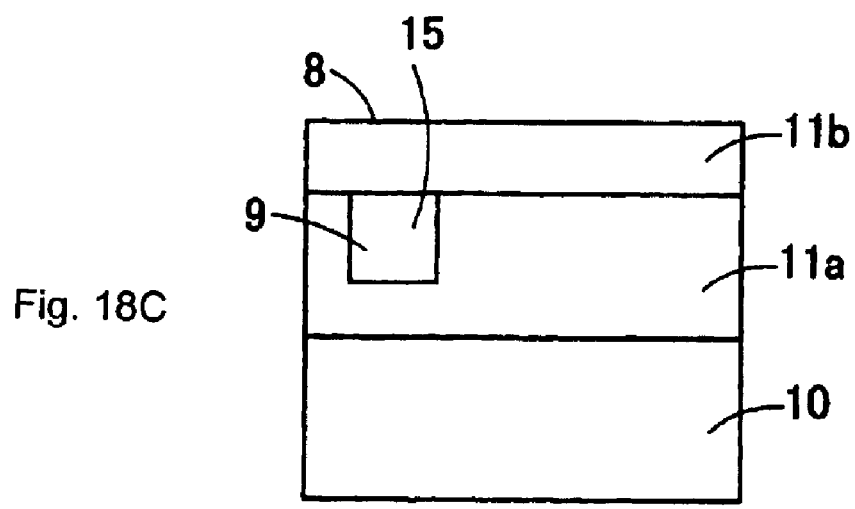
FIG. 18C shows a rear view of the same optical wave guide.

FIG. 17 shows a top view of a S-shaped optical wave guide 8 (S-shaped core) according to another preferred embodiment of the present invention. FIGS. 18A through 18C, respectively, show a front view, a cross sectional view at the line E–E', and a rear view of the optical wave guide 8 shown in FIG. 17. This optical wave guide 8 comprises a substrate 10, a lower cladding layer 11a, a core 9, and an upper cladding layer 11b, and is manufactured through the manufacturing method explained in the first preferred embodiment (copying process). A light projecting element is connected to the light incident end 14 of the core 9, while a light receiving element is connected to the light outgoing end 15 of the core 9.

As shown in FIG. 18B, the cross sectional shape of the curved portion of the core 9 is trapezoidal. This shape is designed so that when light incident from the light incident end 14 of the core 9 and transmitting through the core in single mode comes into the side of the curved portion of the core 9, the incident angle should become over the critical angle and light loss in the core 9 should be restricted. Also, this is designed so that light of multi-mode should not occur.

According to the optical wave guide of the present invention, wherein the side surface of the core 9 at the curved portion is designed so as to restrict transmitting loss, it is possible to make the radius of curvature at the curved portion smaller than that in the conventional similar core (S-shaped core). Thus, it is possible to manufacture a compact size optical wave guide.

Third Embodiment

Figure 19:
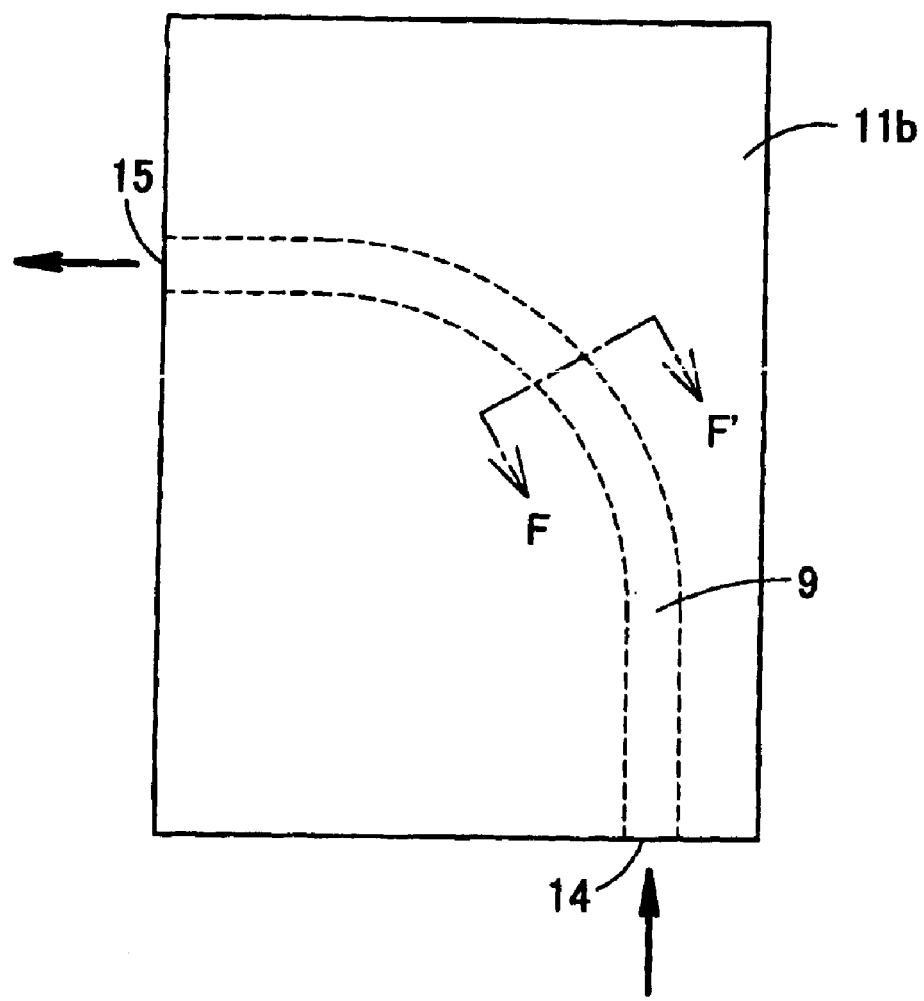
FIG. 19 shows a top view of an optical wave guide (a curved wave guide) according to still another preferred embodiment of the present invention.

FIG. 19 shows an optical wave guide 8 (curved core) according to still another preferred embodiment of the present invention. A front view of the optical wave guide 8 shown in FIG. 19, a cross sectional view at the line F–F', and a left side view are not illustrated herein as they are respectively similar to those shown in FIGS. 18A through 18C. This optical wave guide 8 is manufactured by the manufacturing method explained in the first preferred embodiment, and comprises a substrate 10, a lower cladding layer 11a, a core 9, and an upper cladding layer 11b.

In the optical wave guide 8 according to the present preferred embodiment, the cross sectional shape of the core 9 at the curved portion is trapezoidal. (Refer to FIG. 18B.) This shape is designed so that when light incident from the light incident end 14 of the core 9 and transmitting through the core in single mode comes into the side of the curved portion of the core 9, the incident angle should become over the critical angle and light loss in the core 9 should be restricted. Also, this is designed so that light of multi-mode should not occur.

Fourth Embodiment

Figure 20:
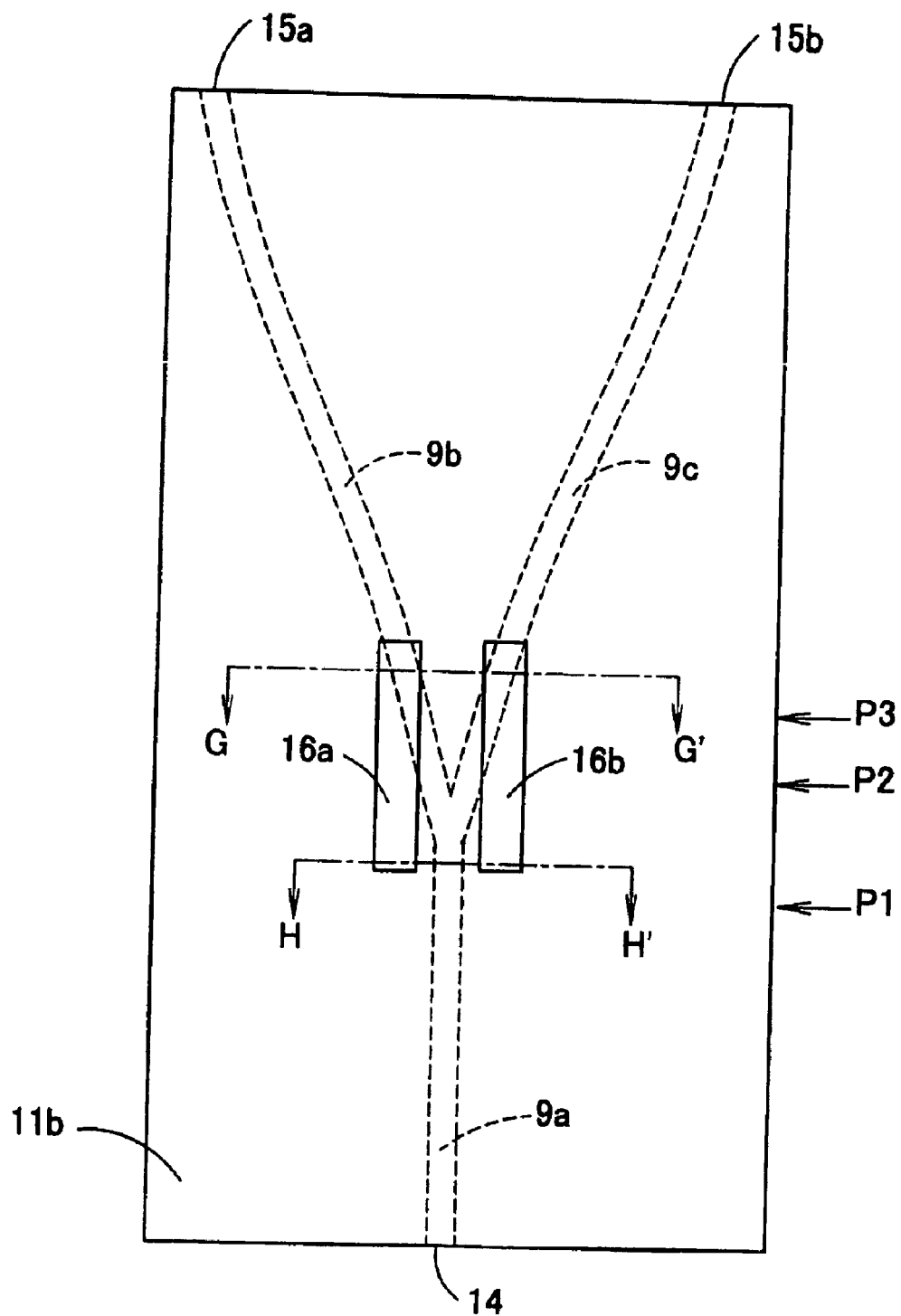
FIG. 20 shows a top view of an optical switch according to still another preferred embodiment of the present invention.

FIG. 20 shows a top view of an optical switch 8A according to still another preferred embodiment of the present invention. FIGS. 21A through 21D, respectively, show a front view of the optical switch 8A of FIG. 20, a cross sectional view at the line H–H', and a rear view. The optical switch 8A of the present invention comprises a substrate 10, a lower cladding layer 11a, a core 9 (a non-branch core 9a, a branch cores 9b and 9c), an upper cladding layer 11b, and heaters 16a and 16b, and is manufactured by the manufacturing method similar to that for the optical wave guide 8 explained in the first preferred embodiment, except that heaters 16a and 16b each comprising a metallic electrode are formed on the upper cladding layer 11b. In the optical switch 8A according to the present invention, on the upper surface of the upper cladding layer 11b, the heater 16a is arranged at the upstream of the branch core 9b, and the heater 16b is arranged at the upstream of the branch core 9c, so as to pinch the non-branch core 9a.

Figure 21A:
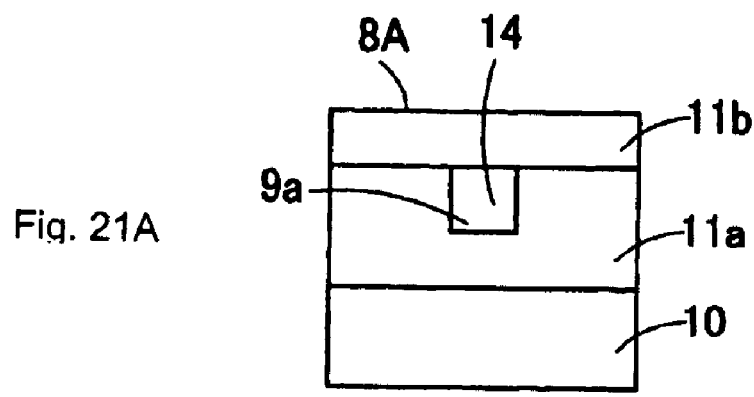
FIG. 21A shows a front view of the same optical switch.
Figure 21B:
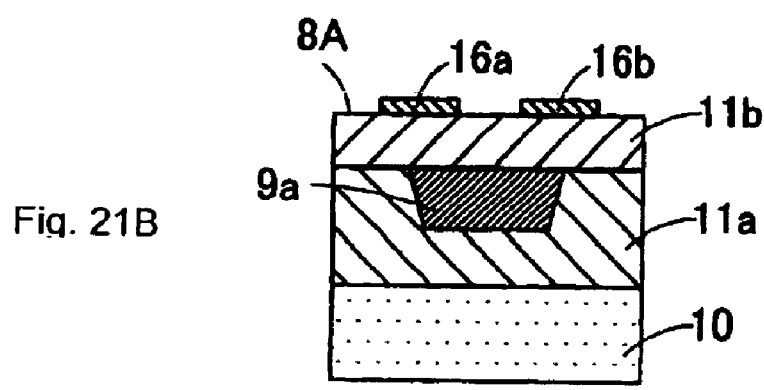
FIG. 21B shows a cross sectional view at the line G–G' in FIG. 20.
Figure 21C:
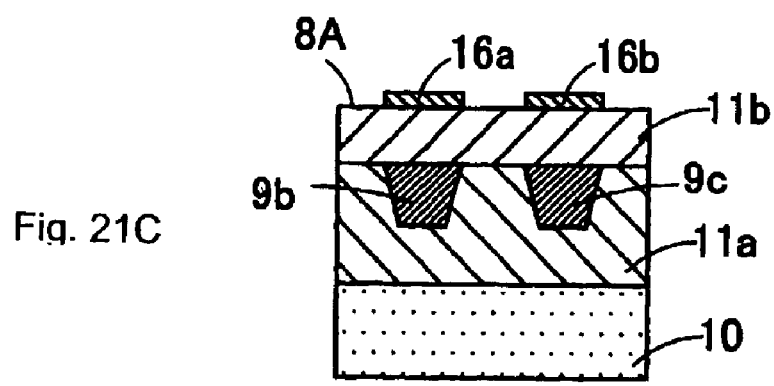
FIG. 21C shows a cross sectional view at the line H–H' in FIG. 20.
Figure 21D:
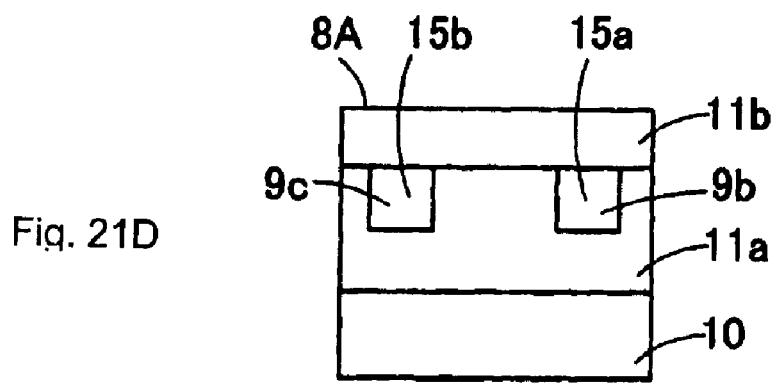
FIG. 21D shows a rear view of the same optical switch.

Also, the non-branch core 9a and the branch cores 9b and 9c are formed into an inverted trapezoidal cross sectional shape, where both the sides are inclined as shown in FIGS. 21B and 21C, in areas except the light incident end 14 and the light outgoing ends 15a and 15b and areas around them. The non-branch core 9a and the branch cores 9b and 9c are formed into a rectangular cross sectional shape, as shown in FIGS. 21A and 21D, at the light incident end 14 and the light outgoing ends 15a and 15b and areas around them, and the cross sectional shape gradually vary in between.

The optical switch 8A according to the present invention is an optical switching element that enables the guiding of light incident from the light incident end 14 into the non-branch core 9a only to either the branch core 9b or the branch core 9c. For switching over the branch core 9b or 9c to which light is guided, thermal optical effect (TO effect) is employed.

Figure 22:
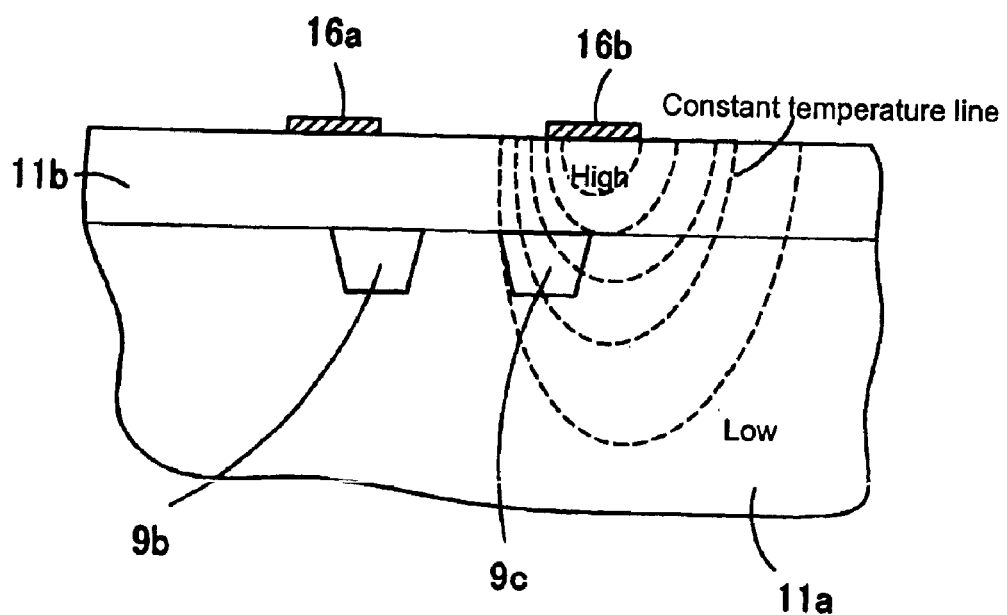
FIG. 22 shows a temperature distribution when heated by a heater.

Herein, the heaters 16a and 16b generate heat when they are turned on, and they are arranged so as to heat only one of the branch cores 9b and 9c respectively. For example, as shown in FIG. 22, when only the heater 16b is turned on to generate heat, such a temperature distribution as shown in the figure occurs around the heater 16b, and the branch core 9c is efficiently heated and the temperature thereof increases. Meanwhile, the temperature of the branch core 9b does not increase, and vice versa when only the heater 16a is heated.

Herein, a case is explained wherein the branch core 9b is turned on, and the branch core 9c is turned off. Thereby, light incident from the light incident end 14 is guided only to the branch core 9b, and is ejected through the light outgoing end 15a. In this case, the heater 16b on the branch core 9c, to which it is desired to shut down light transmission is turned on and the branch core 9c is heated. Meanwhile, the heater 16a on the branch core 9b, to which it is desired to transmit light, is not turned on. Thus, the refractive index of the branch core 9c heated by the heater 16b becomes smaller than the refractive index of the branch core 9b that is not heated. When light coming in from the light incident end 14 reaches the branch portion of the core 9, because the refractive index is low at the side of the branch core 9c, light reaching the branch portion is wave guided to the side of the branch core 9b, and transmits through the branch core 9b.

Further, in this optical switch 8A, as shown in FIGS. 21B and 21C, both side surfaces of the non-branch core 9a and the branch cores 9b and 9c are inclined and the cross sectional shapes thereof are of an inverted trapezoidal shape at least at the branch portion just under the heaters 16a and 16b, and among the sides parallel to the heaters 16a and 16b. The sides (top sides) closer to the heaters 16a and 16b are longer than the sides (bottom sides) farther from the heaters 16a and 16b. As a consequence, at the wedge portion of both the side surfaces of the branch cores 9b and 9c, the thickness of the branch cores 9b and 9c is gradually thinner, and the refractive index becomes small at both sides of the branch cores 9b and 9c. Therefore, light going into the branch core 9b or 9c at the branch portion of the core 9 is converged into the central portion of the branch core 9b or 9c, and thereby, light leakage owing to radiation to both the left and right sides is restricted.

Especially, when the heater 16a or 16b is turned on, the thin portions of both the side surfaces of the branch cores 9b and 9c at the side where the heater is turned on are heated efficiently and the refractive index becomes small. Accordingly, light is transmitted through the branch cores 9c and 9b at the side where the heater is turned off, while light is not transmitted through the branch cores 9b and 9c at the side where the heater is turned on. Further, light going through the branch core 9c or 9b is unlikely to leak to the other branch core 9b or 9c. As a result, the extinction ratio of the optical switch 8A becomes high. For example, when the heater 16b is turned on, the refractive index of the branch core 9c is lowered efficiently, and light goes to the branch core 9b, and is not likely to leak to the branch core 9c. Therefore, the extinction ratio becomes high.

In the case wherein the cross sectional shape of the core 9 at the branch portion is made into a trapezoidal shape whose side closer to the heaters 16a and 16b (top side) was shorter than the side farther from the heaters 16a and 16b (bottom side), such an effect as to increase the extinction ratio was not obtained This is considered because the thin portions of both the sides of the branch cores 9b and 9c were far away from the heaters 16a and 16b.

According to the optical switch 8A of the structure mentioned above, it is possible to increase extinction ratio. Therefore, there is no need to increase electricity consumption of the heaters 16a and 16b so as to increase extinction ratio. Further, it is possible to keep the difference between portions with large refractive index and portions with small refractive index small. As a consequence, multi-mode light rarely occurs.

Figure 24A:
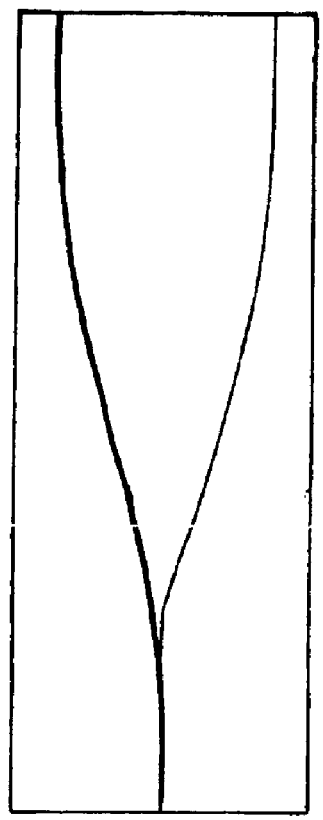
Figure 24B:
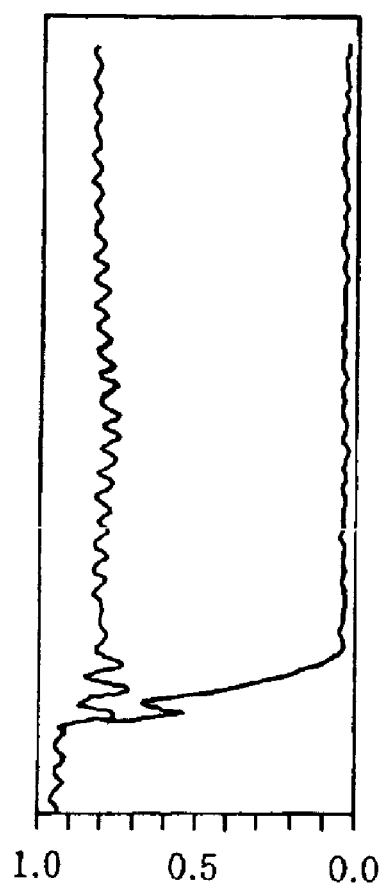
FIG. 24B shows a graph with the horizontal axis showing power intensity, and with the vertical axis showing power changes in respective branch cores in the lengthwise distance of optical switch.

Next, the results of a simulation of an optical switch 8A having a core 9 whose cross sectional shape at the branch portion is trapezoidal, and a conventional optical switch having a core whose cross sectional shape is rectangular, together with a simulation on light power transmitting through the respective cores, are shown in FIG. 23 and FIG. 24. FIG. 23A shows a top view wherein light transmitting power at the moment when only one heater is turned on in the optical switch 8A is shown by line thickness. FIG. 23B shows a graph with the horizontal axis showing power intensity with the vertical axis showing power changes in respective branch cores in the lengthwise distance of the optical switch. In the same manner, FIG. 24A shows a top view wherein light transmitting power at the moment when only one heater is turned on in the conventional optical switch is shown by line thickness. FIG. 24B shows a graph with the horizontal axis showing power intensity with the vertical axis showing power changes in respective branch cores in the lengthwise distance of the optical switch.

As is clear from a comparison of FIG. 23 and FIG. 24, in the conventional optical switch shown in FIG. 24, light of power around 10% flows in the branch core at the side where the heater is turned on, and only light of power around 90% is transmitted at the side where the heater is turned off. Meanwhile, in the optical switch according to the present invention, the power of light flowing through the branch core at the side where the heater is turned on becomes almost 0%, and light of power nearly 100% is transmitted to the side where the heater is turned off. Thus, high extinction ratio and small transmitting loss are realized.

Figure 25A:
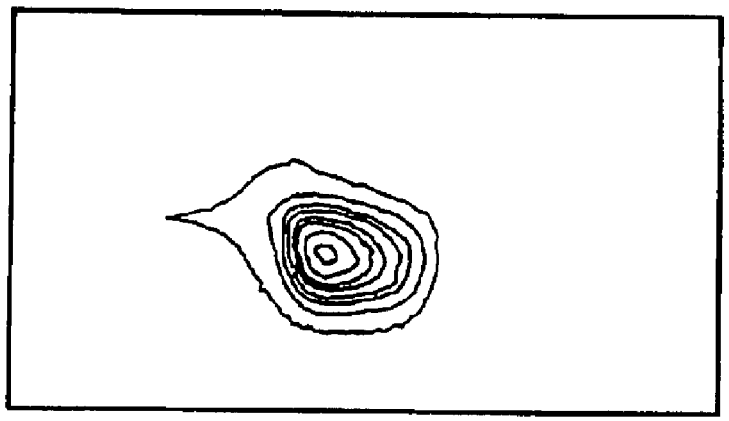
FIGS. 25A, 25B, and 25C respectively show light power distributions at cross sections at the positions in the optical switch according to the present invention.
Figure 25B:
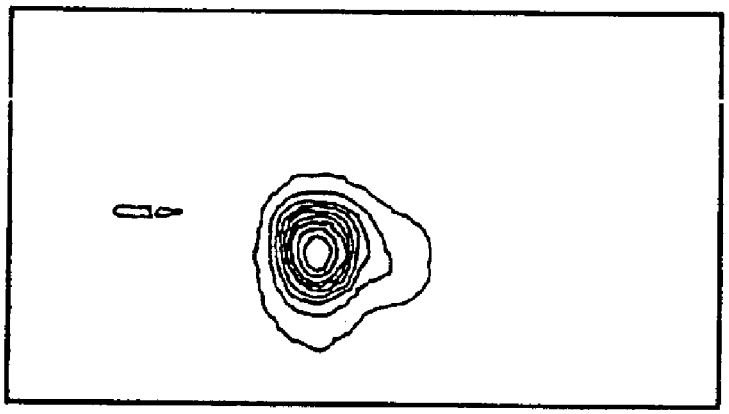
Figure 25C:
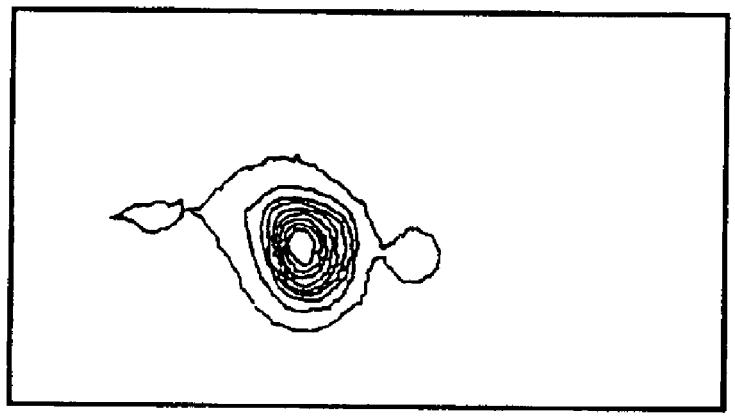
Figure 26A:
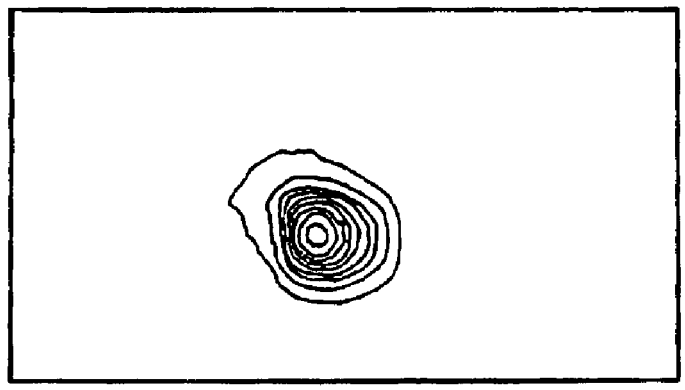
FIGS. 26A, 26B, and 26C respectively show light power distributions at cross sections at similar positions concerning the optical switch according to the prior art.
Figure 26B:
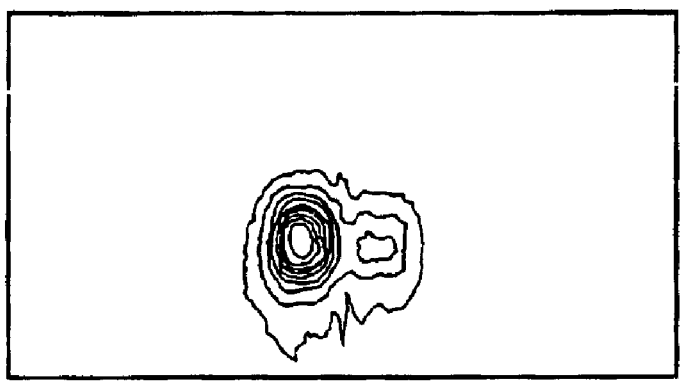
Figure 26C:
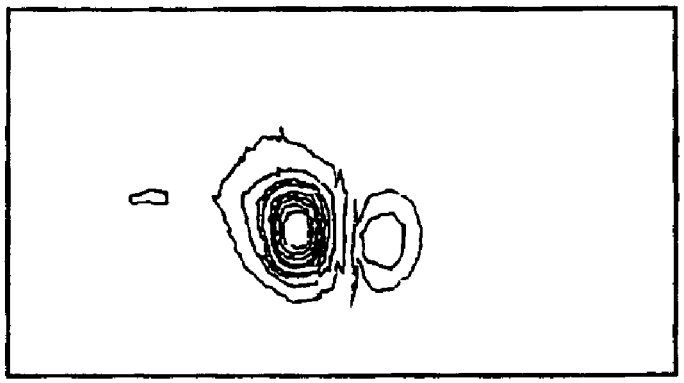
Figure 27A:
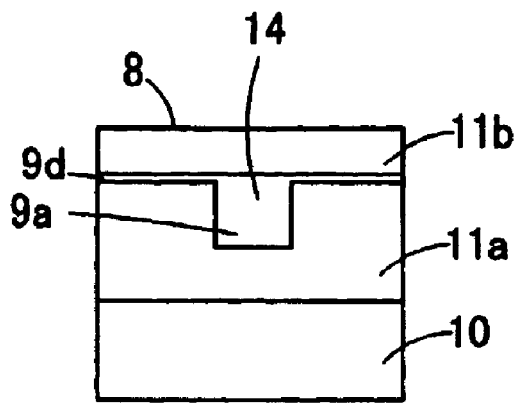
FIG. 27A shows a front view of a modified example of the optical wave guide according to the present preferred embodiment, FIG. 27B
Figure 27B:
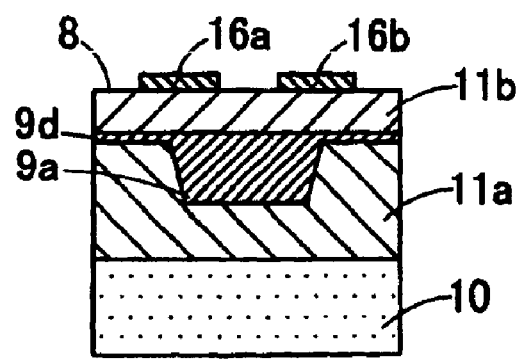
FIG. 27C shows a cross sectional view.
FIG. 27D shows a rear view thereof.
Figure 27C:
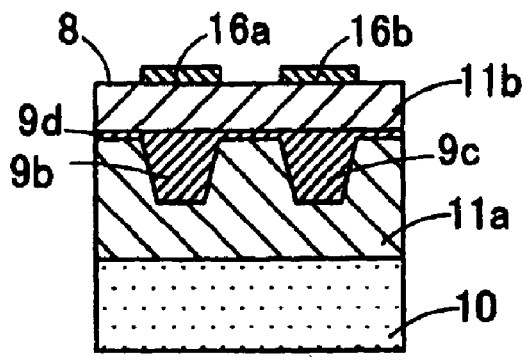
Figure 27D:
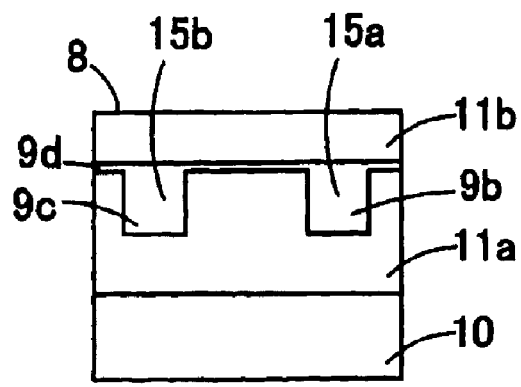

Also, FIGS. 25A, 25B, and 25C respectively show light power distributions at cross sections at the positions P1, P2, and P3 in FIG. 20 concerning the optical switch according to the present invention. In the same manner, FIGS. 26A, 26B, and 26C respectively show light power distributions at cross sections at similar positions concerning the optical switch according to the prior art. From the comparison of FIG. 25 and FIG. 26 too, it is found that lower leakage to the branch core at the side where the heater is turned on is extremely small in the optical switch according to the present invention.

In the optical switch 8A according to the above preferred embodiment, the branch cores 9b and 9c as well as the non-branch core 9a are formed into a symmetrical cross sectional shape. With regard to the branch cores 9b and 9c, only the side surface of that side which is farther from the other branch core 9c and 9b may be inclined, and the side surface of the side which is closer to the other branch core 9c and 9b may be made into a vertical surface.

FIG. 27A through 27D, respectively, show a front view of a modified example of the optical switch 8A according to the present preferred embodiment, a cross sectional view corresponding to the line G–G' in FIG. 20, a cross sectional view corresponding to the line H–H' in FIG. 20, and a rear view thereof. These show that when the core 9 (non-branch core 9a, branch cores 9b and 9c) is formed, the core resin flows out from the side of the core 9 onto the upper surface of the lower cladding layer 11a, and a thin film of bar 9d is formed. In the optical switch 8A, it is no problem that bar 9d as shown in FIG. 27A through 27D maybe formed. However, if light transmitting through the core 9 comes into the bar 9d, light will leak out through the bar 9d. Therefore, it is preferred to make the thickness of the bar 9d as thin as possible.

Fifth Embodiment

Figure 28:
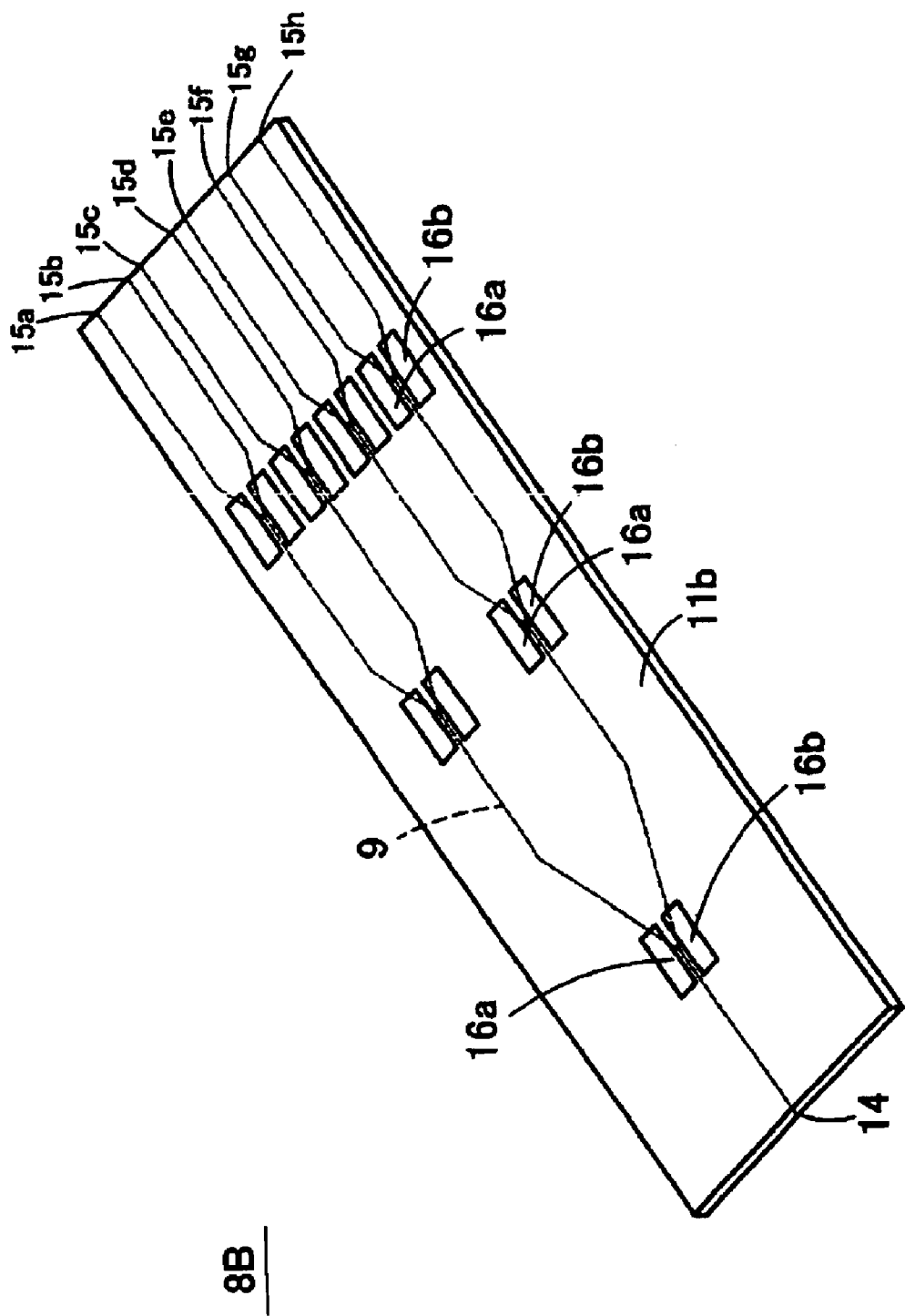
FIG. 28 shows a perspective view of an optical switch as still another preferred embodiment according to the present invention.

FIG. 28 shows a figure for explaining an optical switch 8B as still another preferred embodiment according to the present invention. This optical switch 8B is manufactured by the manufacturing method explained in the first preferred embodiment, and comprises a substrate 10, a lower cladding layer 11a, a core 9, and an upper cladding layer 11b, and a heater 16. The core 9 has two or more branch portions, and three or more light outgoing ends 15a, 15b, . . . On the upper surface of the upper cladding layer 11b, a set of heaters 16a and 16b is arranged so as to pinch each of the branch portions. And in this structure, each set of heaters 16a and 16b is individually switched over, thereby the transmitting destination of light coming in from the light incident end 14 maybe switched to optional light outgoing ends 15a, 15b, . . . 15h.

In this optical switch 8B, the cross sectional shape near the branch portions of the core 9 is made into a trapezoidal shape, and the shapes of the light incident end 14 and the light outgoing ends 15a, 15b, . . . 15h are made into such shapes as a square, a rectangular, or the like, for little joint loss with an optical fiber or the like to be connected thereto. As a consequence, according to this optical switch 8B, at the branch portions thereof, light maybe transmitted efficiently to desired branch destinations, and because joint loss becomes small at the end surface of the core 9, it is possible to transmit and distribute light in an efficient manner.

Other Embodiments

Figure 29:
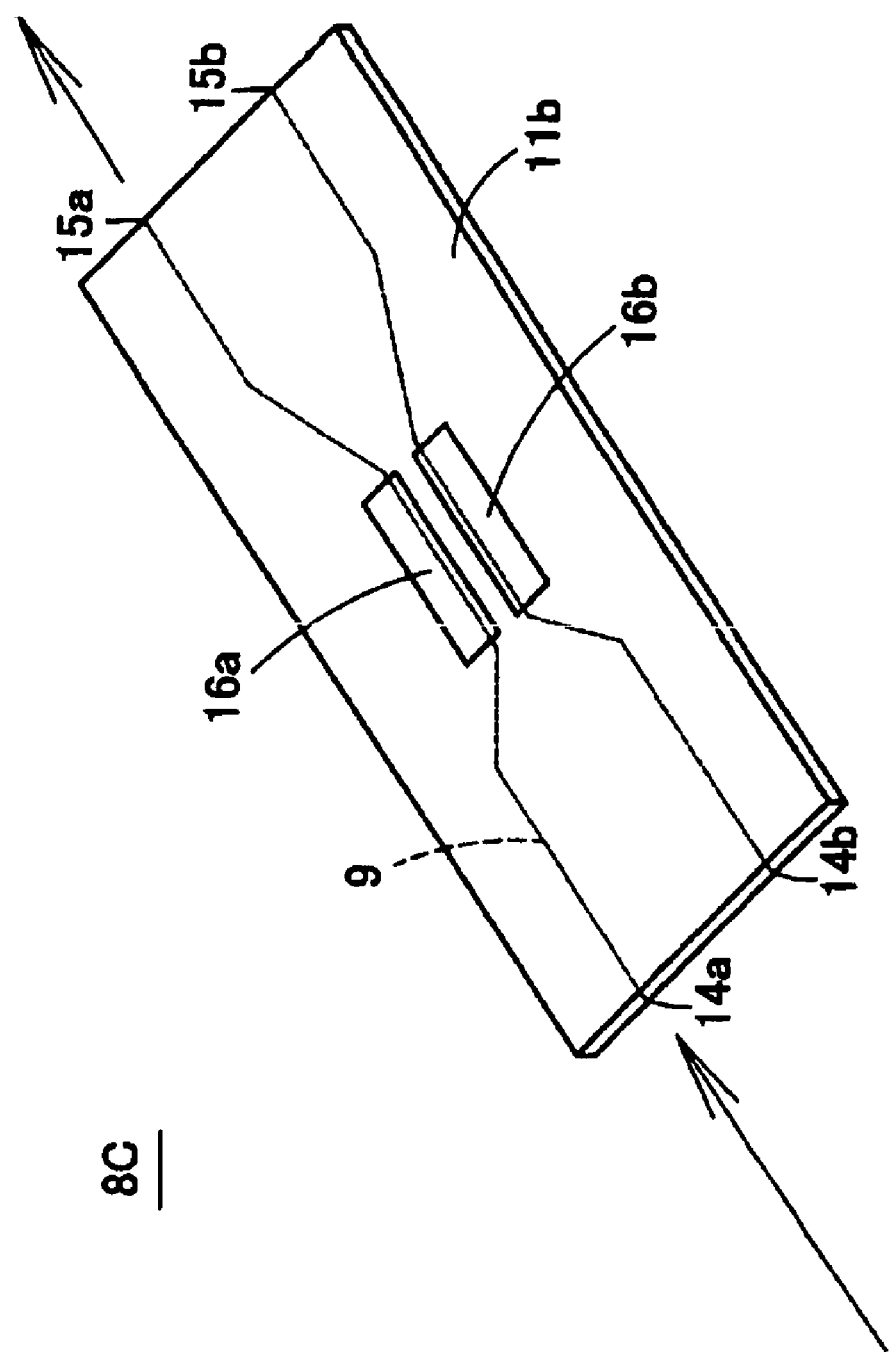
FIG. 29 shows a perspective view of a directional coupler (optical switch) as still another preferred embodiment according to the present invention.
Figure 30:
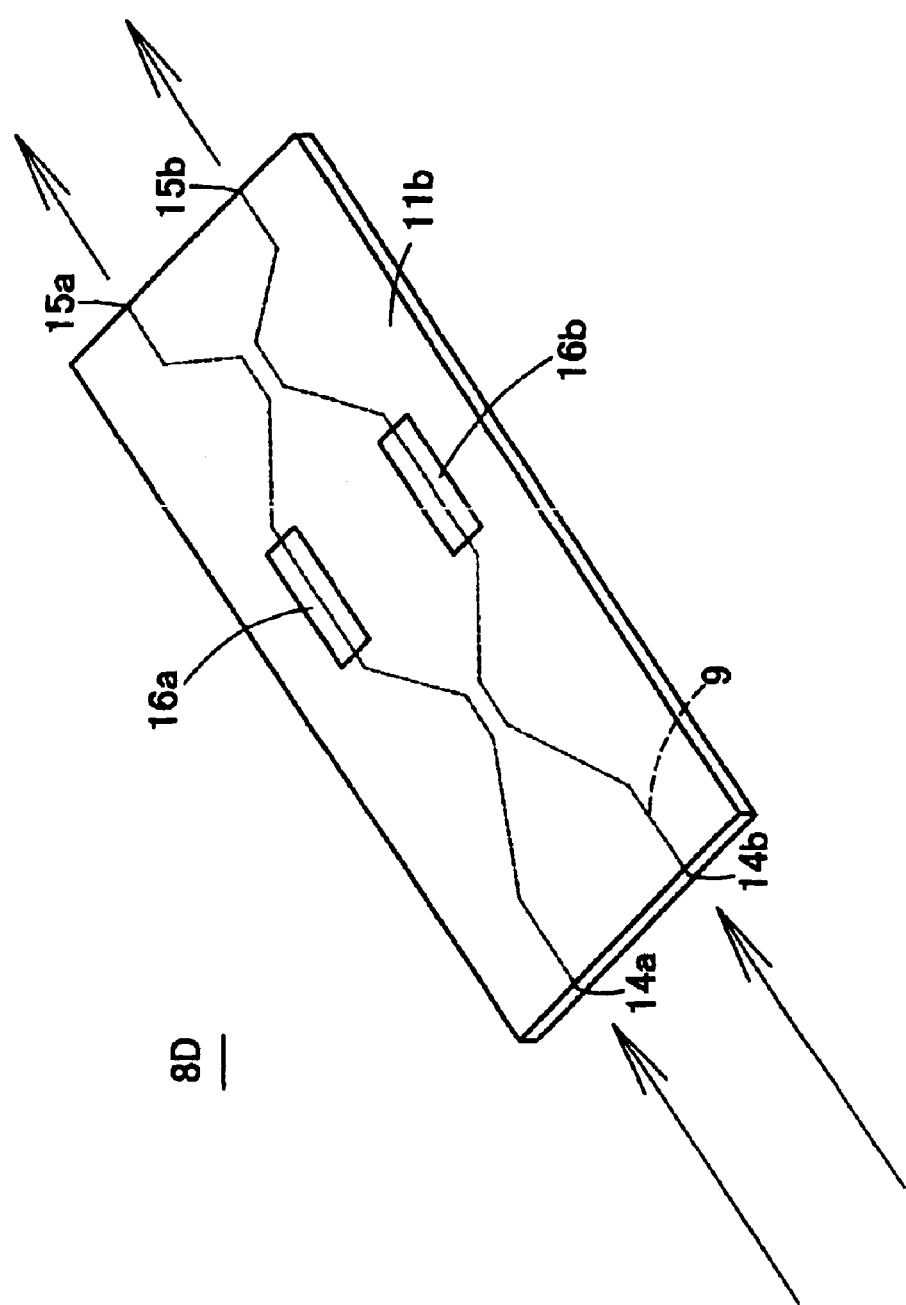
FIG. 30 shows a perspective view of a Mach-Zehnder interferometer directional coupler (optical switch) as still another preferred embodiment according to the present invention.
Figure 31:
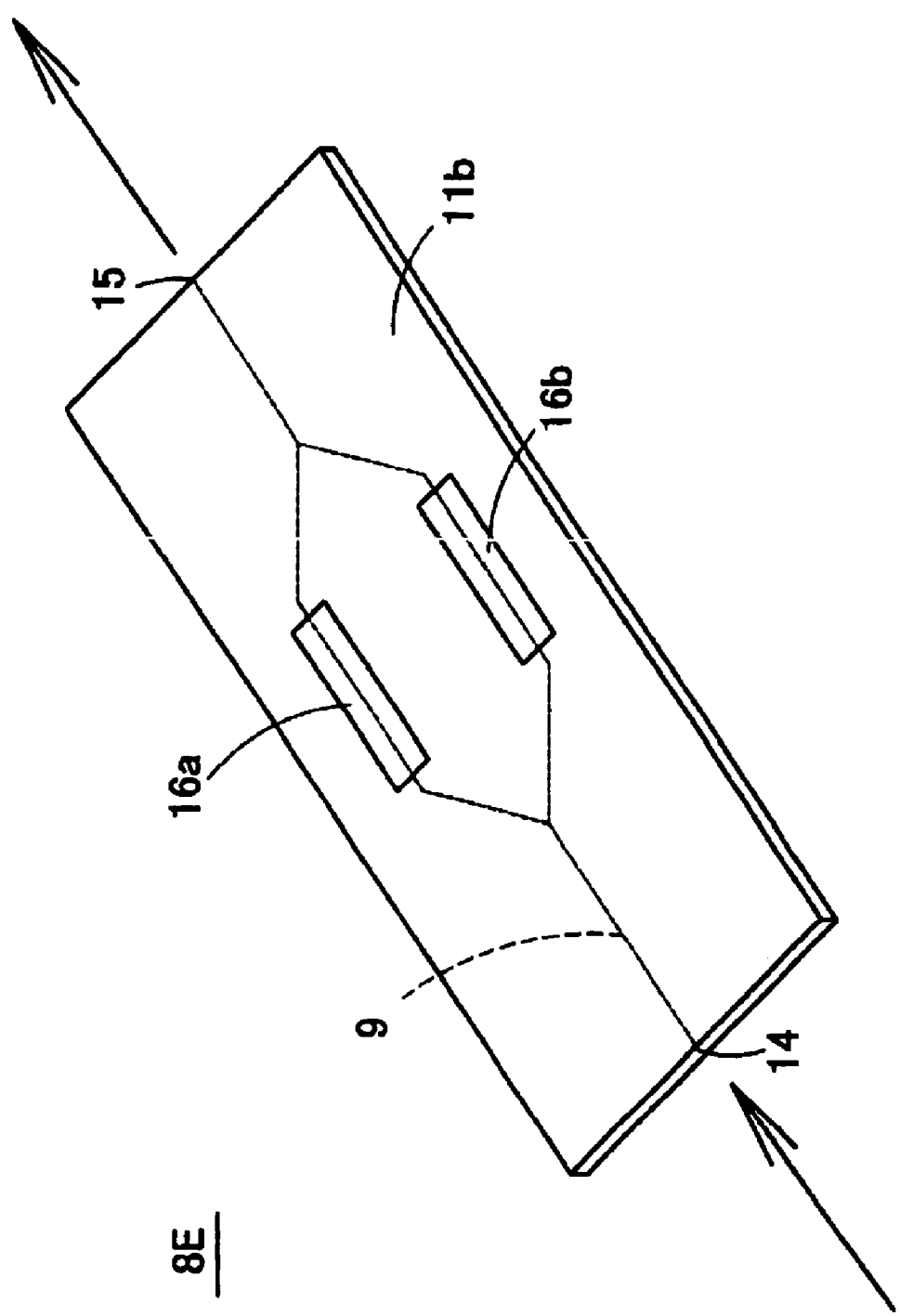
FIG. 31 shows a perspective view of a Mach-Zehnder interferometer directional coupler (variable attenuator) as still another preferred embodiment according to the present invention.
Figure 32:
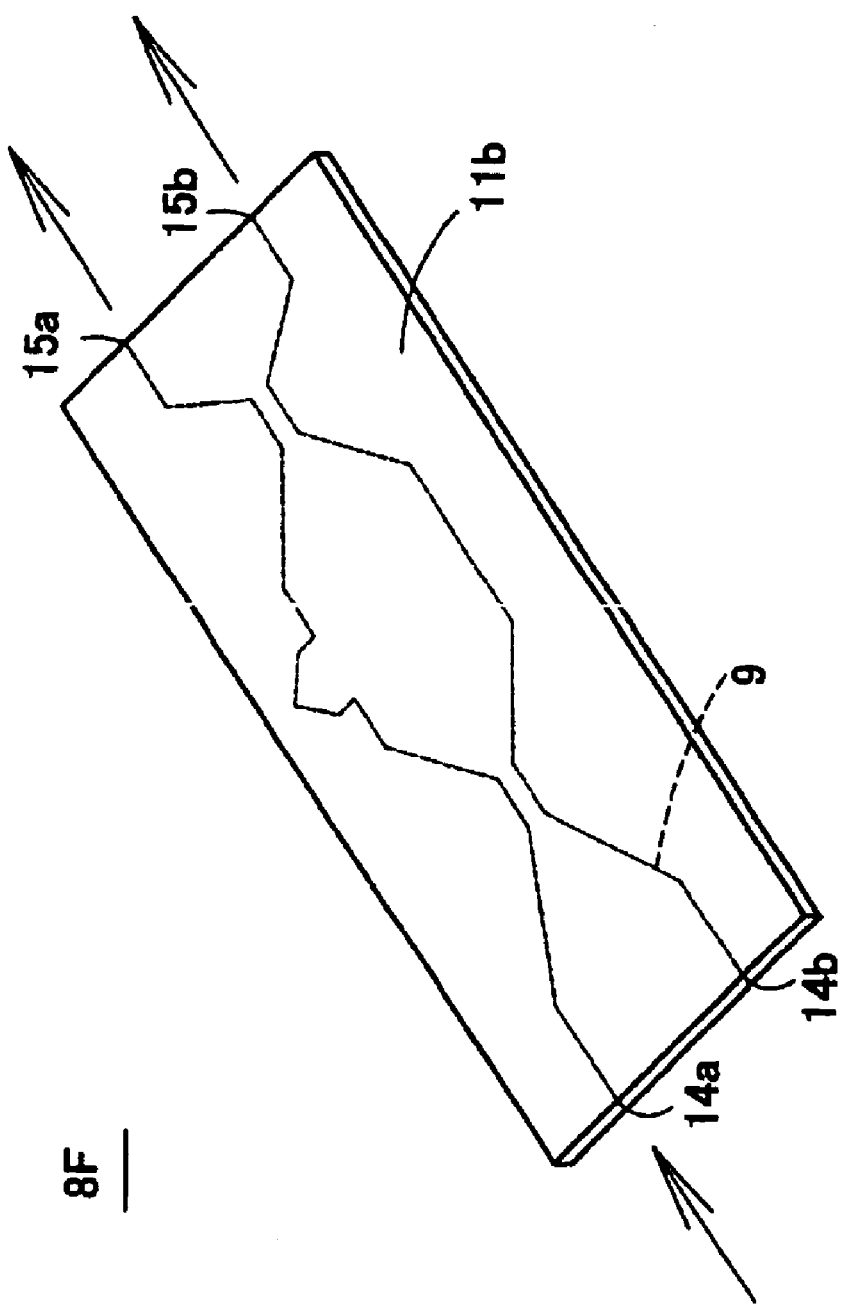
FIG. 32 shows a perspective view of an asymmetrical Mach-Zehnder interferometer directional coupler (wave coupler and separator) as still another preferred embodiment according to the present invention.
Figure 33:
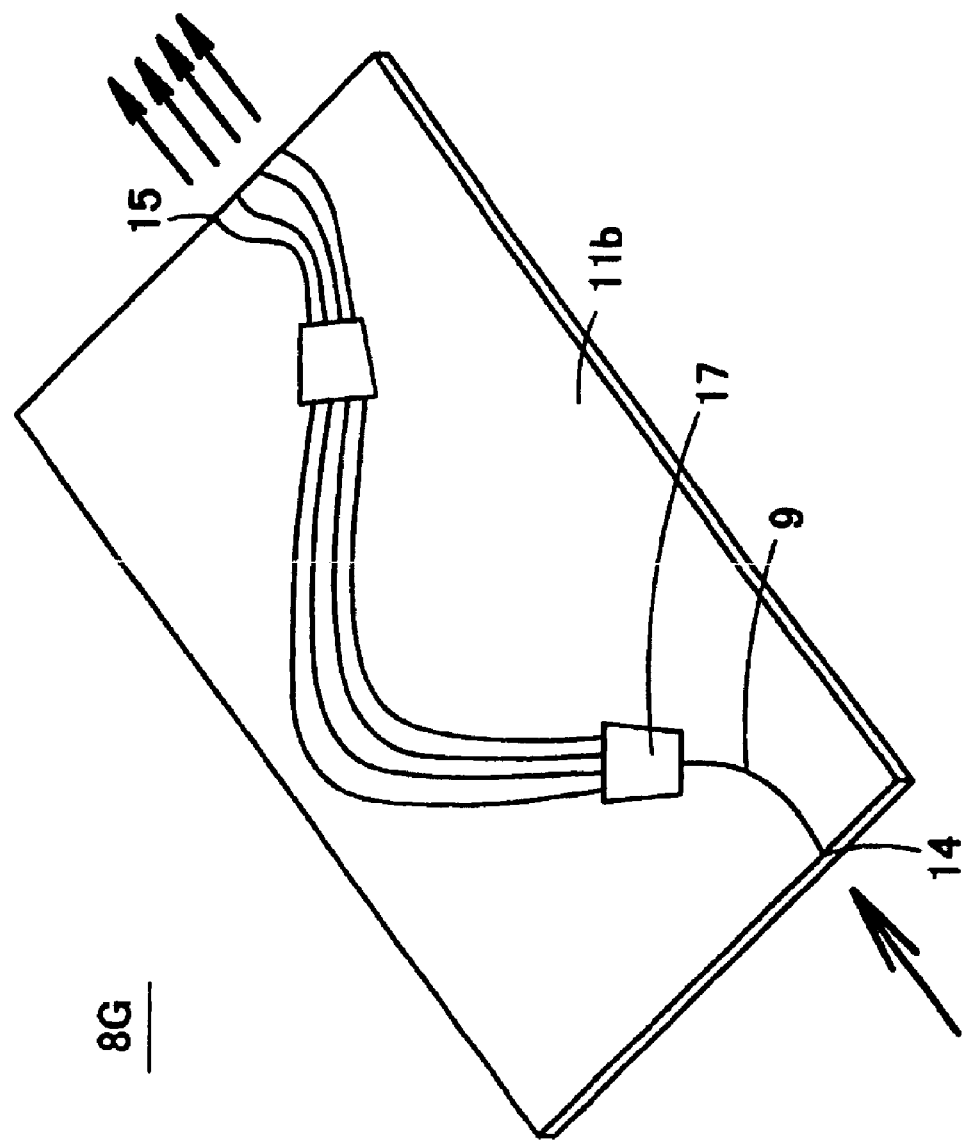
FIG. 33 shows a perspective view of an AWG curved core (wave coupler and separator) as still another preferred embodiment according to the present invention.
Figure 34:
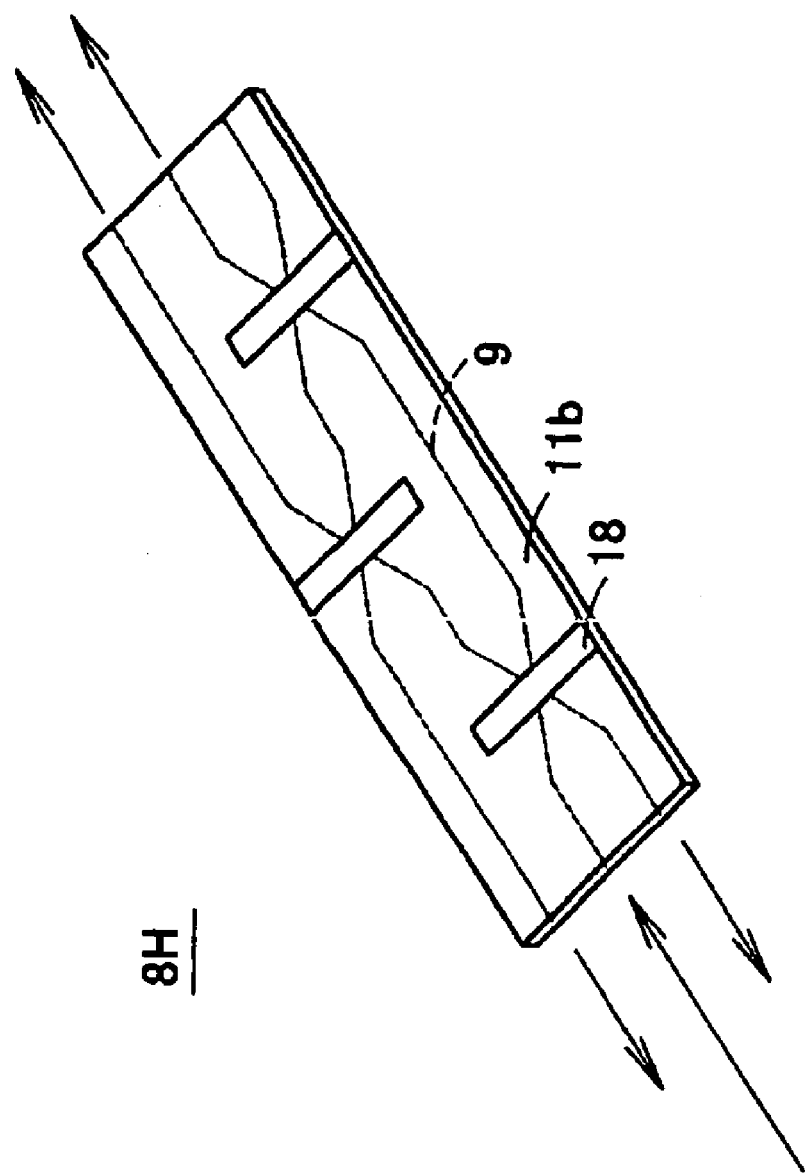
FIG. 34 shows a perspective view of a wave coupler and separator as still another preferred embodiment according to the present invention.
Figure 35:
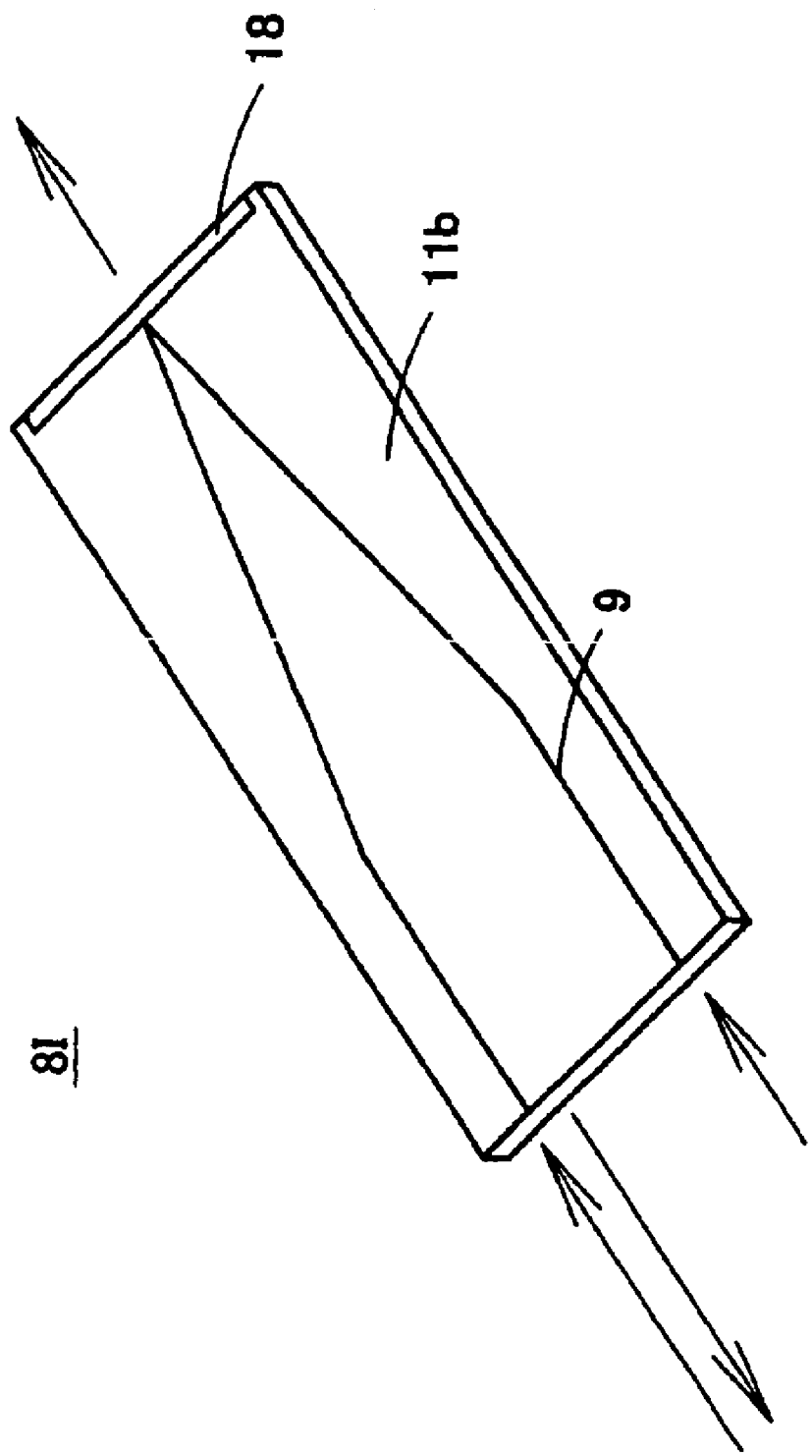
FIG. 35 shows a perspective view of an optical transceiver as still another preferred embodiment according to the present invention.
Figure 36:
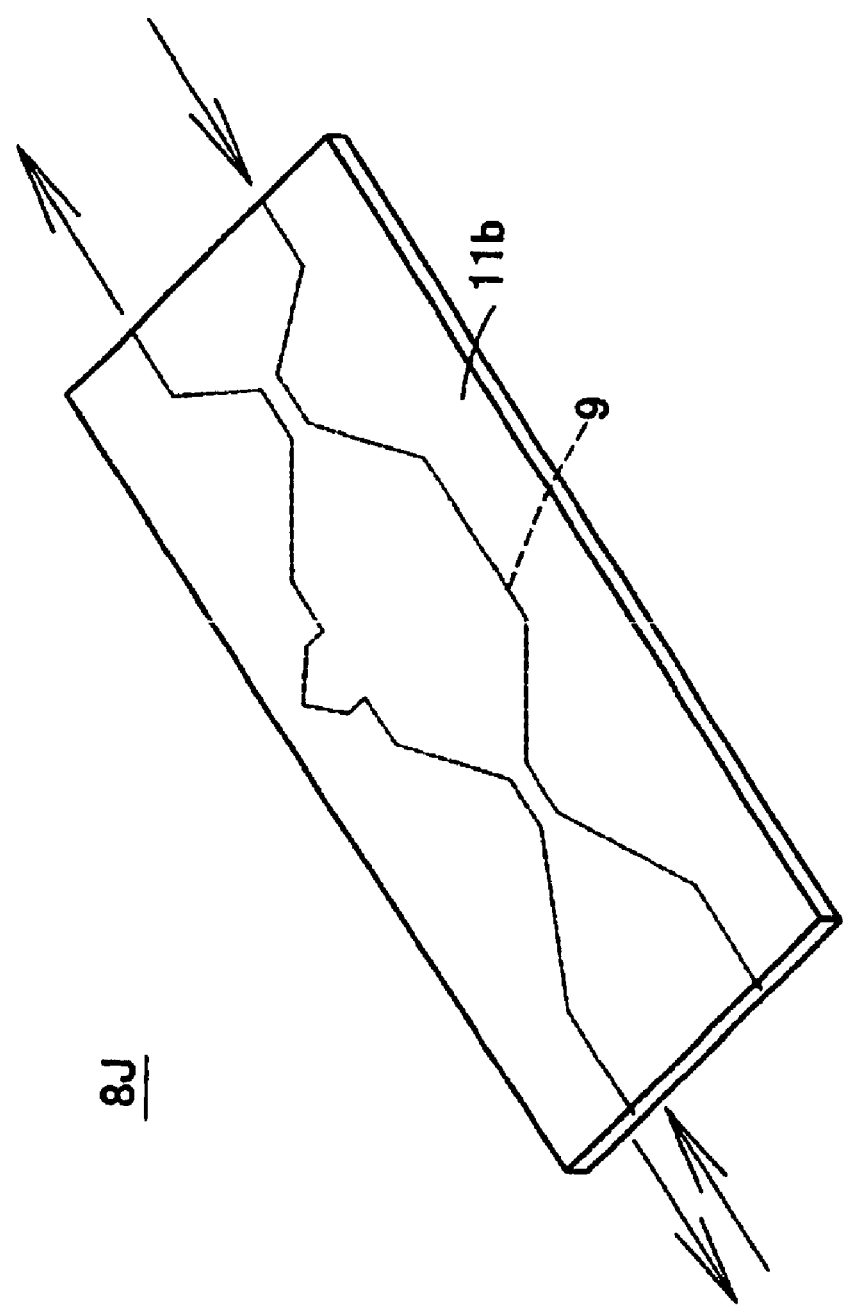
FIG. 36 shows a perspective view of an optical transceiver as still another preferred embodiment according to the present invention.

An optical wave guide according to the present invention may be applied to various applications. For example, an optical wave guide of the present invention may be applied to a directional coupler (optical switch) 8C using two cores 9 and heaters 16a and 16b as shown in FIG. 29; a Mach-Zehnder interferometer directional coupler (optical switch) 8D using two cores 9 and heaters 16a and 16b as shown in FIG. 30; a Mach-Zehnder interferometer directional coupler (variable attenuator) 8E comprising a core 9 that is branched halfway into two cores and combined again thereafter and heaters 16a and 16b as shown in FIG. 31; an asymmetrical Mach-Zehnder interferometer directional coupler (wave coupler and separator) comprising two asymmetrical cores 9 as shown in FIG. 32; an AWG curved core (wave coupler and separator) 8G comprising plural cores 9 and star couplers 17 as shown in FIG. 33; a wave coupler and separator 8H comprising plural cores 9 and filters 18 as shown in FIG. 34; an optical transceiver 8I comprising a Y-branched core 9 and a filter 18 as shown in FIG. 35 (light source and light detecting element not illustrated therein); an optical transceiver 8J comprising an asymmetrical Mach-Zehnder interferometer directional coupler consisting of two cores 9 (light source and light detecting element not illustrated therein) as shown in FIG. 36; and so forth.

What is claimed is:

1. An optical wave guide comprising:

a substrate;

a cladding layer mounted on the substrate; and a core having a bend segment and a straight segment disposed within the cladding layer, wherein the straight segment connecting the bend segment and extending to an end face of the cladding layer, wherein a cross-sectional shape of the bend segment is formed in a trapezoidal shape;

a cross-sectional shape of the straight segment is formed in a rectangular shape; and a cross-sectional shape of the core is gradually changed from the rectangular shape to the trapezoidal shape.

2. The optical wave guide according to claim 1, wherein the cross-sectional shape of the bend segment is formed in an inverted trapezoidal shape such that at least an outer portion of the bend segment is tapered.

3. The optical wave guide according to claim 1, wherein the core further comprises:
   a Y-branched segment jointing the straight segment with a first bend segment and a second bend segment, and
   wherein each of the first bend segment and the second bend segment extends to an opposite end face of the cladding layer.

4. The optical wave guide according to claim 3, each of cross-sectional shapes of the first bend segment and the second bend segment in the proximity of the Y-branched segment is formed in an inverted trapezoidal shape such that each of at least outer portions of the first bend segment and the second bend segment is tapered.

5. The optical wave guide according to claim 3, each of cross-sectional shapes of the first bend segment and the second bend segment in the proximity of the opposite end face is formed in a rectangular shape.

6. The optical wave guide according to claim 3, further comprising a heating module disposed proximate to the Y-branched segment of the core.

7. The optical wave guide according to claim 1, wherein the cross-sectional shape of the core is changed from the rectangular shape to the trapezoidal shape at the straight segment.

8. The optical wave guide according to claim 1, wherein the cross-sectional shape of the core is changed from the rectangular shape to the trapezoidal shape at the bend segment.

9. The optical wave guide according to claim 1, wherein the cross-sectional shape of the core is changed from the rectangular shape to the trapezoidal shape between the straight segment and the bend segment.

10. An optical wave guide comprising:
    a substrate;
    a cladding layer mounted on the substrate;
    a core having a first bend segment, a second bend segment and a straight segment disposed within the cladding layer;
    the straight segment extending to an end face of the cladding layer;
    each of the first bend segment and the second bend segment extends to an opposite end face of the cladding layer; and
    a Y-branched segment jointing the straight segment with the first bend segment and the second bend segment,
    wherein a cross-sectional shape of the first bend segment and the second bend segment are formed in a trapezoidal shape;
    each of cross-sectional shapes of the first bend segment and the second bend segment in the proximity of the opposite end face is formed in a rectangular shape; and
    wherein a cross-sectional shape of the core is gradually changed from the rectangular shape to the trapezoidal shape.

* * * * *